(12) United States Patent
Howe et al.

(10) Patent No.: US 10,760,877 B2
(45) Date of Patent: Sep. 1, 2020

(54) WEAPON SIGHT LIGHT EMISSION SYSTEM

(71) Applicant: HiViz LLC, Laramie, WY (US)

(72) Inventors: Phillip D. Howe, Laramie, WY (US);
Bradley R. Smith, Timnath, CO (US);
David A. Tinch, Laramie, WY (US);
Jason D. Webb, Laramie, WY (US)

(73) Assignee: HiViz, LLC, Laramie, WY (US)

( * ) Notice: Subject to any disclaimer, the term of this patent is extended or adjusted under 35 U.S.C. 154(b) by 139 days.

(21) Appl. No.: 15/953,374

(22) Filed: Apr. 13, 2018

(65) Prior Publication Data

US 2018/0231350 A1   Aug. 16, 2018

Related U.S. Application Data

(63) Continuation-in-part of application No. 14/579,846, filed on Dec. 22, 2014, now Pat. No. 10,088,274, (Continued)

(51) Int. Cl.
*F41G 1/34* (2006.01)
*G02B 6/06* (2006.01)
(Continued)

(52) U.S. Cl.
CPC ............... *F41G 1/345* (2013.01); *F41G 1/01* (2013.01); *F41G 1/14* (2013.01); *G02B 6/06* (2013.01)

(58) Field of Classification Search
CPC ........................................................ F41G 1/345
See application file for complete search history.

(56) References Cited

U.S. PATENT DOCUMENTS

| 815,090 A | 3/1906 | Hukill |
| 898,531 A | 9/1908 | Tufts |
(Continued)

FOREIGN PATENT DOCUMENTS

| AT | 507403 | 4/2010 |
| CH | 667150 | 9/1988 |
(Continued)

OTHER PUBLICATIONS

U.S. Appl. No. 61/459,749, filed Dec. 17, 2010.
(Continued)

*Primary Examiner* — Reginald S Tillman, Jr.
(74) *Attorney, Agent, or Firm* — Craig R. Miles; CR Miles P.C.

(57) ABSTRACT

A light emission assembly for a weapon sight, and methods of making and using such a light emission assembly, whereby the light emission assembly includes a light conductive member having a light conductive member length disposed between light conductive member first and second ends; a chamber disposed inside of the light conductive member proximate the light conductive member second end, whereby the chamber can be configured to contain a light emitting element; and a light conductive protrusion axially coupled to the light conductive member proximate the light conductive member first end, whereby the light conductive protrusion terminates in a viewing end, the viewing end cross-sectional area lesser than a light conductive member first end cross-sectional area.

21 Claims, 30 Drawing Sheets

Related U.S. Application Data which is a continuation-in-part of application No. 13/200,628, filed on Sep. 26, 2011, now Pat. No. 8,925,237.

(60) Provisional application No. 61/459,749, filed on Dec. 17, 2010.

(51) Int. Cl.
*F41G 1/14* (2006.01)
*F41G 1/01* (2006.01)

(56) References Cited

U.S. PATENT DOCUMENTS

| | | |
|---|---|---|
| 1,292,211 A | 1/1919 | Young |
| 1,346,303 A | 7/1920 | Trevor et al. |
| 1,363,553 A | 12/1920 | Barringer |
| 1,818,381 A | 8/1931 | Caruth |
| 2,706,335 A | 4/1955 | Munsey |
| 2,970,380 A | 2/1961 | Hill |
| 3,098,303 A | 7/1963 | Plisk |
| 3,121,163 A | 2/1964 | Rickert |
| 3,192,632 A | 7/1965 | Von Stavenhagen |
| 3,362,074 A | 1/1968 | Luebkeman et al. |
| 3,641,676 A | 2/1972 | Knutsen et al. |
| 3,645,635 A | 2/1972 | Steck |
| 3,678,590 A | 7/1972 | Hayward |
| 3,698,092 A | 10/1972 | Rosenhan |
| 3,700,339 A | 10/1972 | Steck, III |
| 3,813,790 A | 6/1974 | Kaltmann |
| 3,886,667 A | 6/1975 | Rueb |
| 3,905,708 A | 9/1975 | Steck, III |
| 3,949,482 A | 4/1976 | Ross |
| 4,070,763 A | 1/1978 | Carts, Jr. |
| 4,136,963 A | 1/1979 | Budden et al. |
| 4,495,705 A * | 1/1985 | Kowalski ............... F41G 1/467 124/87 |
| 4,536,965 A | 8/1985 | Tildeblad |
| 4,574,335 A | 3/1986 | Frimer |
| 4,745,686 A | 5/1988 | Willis |
| 4,745,698 A | 5/1988 | Schwulst |
| 4,806,007 A | 2/1989 | Bindon |
| 4,877,324 A | 10/1989 | Hauri et al. |
| 5,065,519 A | 11/1991 | Bindon |
| 5,279,061 A | 1/1994 | Betz et al. |
| 5,359,800 A | 11/1994 | Fisher |
| 5,500,911 A | 3/1996 | Roff |
| 5,560,113 A | 10/1996 | Simo et al. |
| 5,638,604 A | 6/1997 | Lorocco |
| 5,735,070 A | 4/1998 | Vasquez et al. |
| 5,822,872 A | 10/1998 | Waki |
| 5,850,700 A | 12/1998 | Capson et al. |
| 5,862,618 A | 1/1999 | Brown |
| 5,878,503 A | 3/1999 | Howe et al. |
| 5,926,963 A | 7/1999 | Knight |
| 5,930,906 A | 8/1999 | Howe et al. |
| 5,956,854 A | 9/1999 | Lorocco |
| 6,014,830 A | 1/2000 | Brown et al. |
| 6,035,539 A | 3/2000 | Hollenbach et al. |
| 6,058,615 A | 5/2000 | Uhlmann et al. |
| 6,058,616 A | 5/2000 | Bubits |
| 6,122,833 A | 9/2000 | Lorocco |
| 6,216,352 B1 | 4/2001 | Lorocco |
| 6,233,836 B1 | 5/2001 | Uhlmann |
| 6,358,855 B1 | 3/2002 | Ramachandran et al. |
| 6,360,471 B1 | 3/2002 | Stein |
| 6,360,472 B1 | 3/2002 | Lorocco |
| 6,385,855 B1 * | 5/2002 | Tymianski ............... F41G 1/345 33/263 |
| 6,421,946 B1 | 7/2002 | LoRocco |
| 6,446,377 B1 | 9/2002 | Hollenbah et al. |
| 6,678,987 B2 | 1/2004 | Howe |
| 6,684,551 B2 | 2/2004 | Howe |
| 7,451,566 B1 | 11/2008 | Price |
| 7,562,486 B2 | 7/2009 | LoRocco |
| 7,627,976 B1 | 12/2009 | Olson |
| D679,359 S | 4/2013 | Adock, Jr. |
| 8,635,800 B2 | 1/2014 | Glimpse et al. |
| 8,635,801 B2 | 1/2014 | Glimpse et al. |
| D700,268 S | 2/2014 | Hormberg |
| 8,925,237 B2 | 1/2015 | Howe et al. |
| 2006/0123687 A1 | 6/2006 | Howe et al. |
| 2008/0184609 A1 | 8/2008 | Schulst |
| 2009/0013581 A1 | 1/2009 | LoRocco |
| 2011/0107650 A1 | 5/2011 | Howe et al. |
| 2011/0314721 A1 | 12/2011 | Lamb |
| 2012/0198750 A1 | 8/2012 | Mansfield |
| 2013/0255129 A1 | 10/2013 | Curry |
| 2014/0096430 A1 | 4/2014 | Kruse |

FOREIGN PATENT DOCUMENTS

| | | |
|---|---|---|
| EP | 0254675 | 1/1988 |
| GB | 1532090 | 11/1978 |
| WO | WO 2006/111813 | 10/2006 |
| WO | WO2010/034458 | 4/2010 |
| WO | WO2011/067291 | 6/2011 |

OTHER PUBLICATIONS

U.S. Appl. No. 14/579,846, filed Dec. 22, 2014.
Aro-Tek Ltd. Tri-Lite Day/Night Sight, Catalog, 1997, 3 total pages.
MB-Microtec. Tactical Lynx, on-line catalog, www.mbmicrotec.com, originally downloaded May 31, 2011, 3 total pages.
Personal Defense World. Truglo Introduces the new Brite-Site TFX Handgun Sight. Website, http://www.personaldefenseworld.com, originally downloaded Apr. 22, 2015, 5 pages total.
Truglo. TFX™ Tritium/Fiber-Optic Day/Night Sights. Website, http://www.truglo.com, originally downloaded Mar. 20, 2015, 1 page.

* cited by examiner

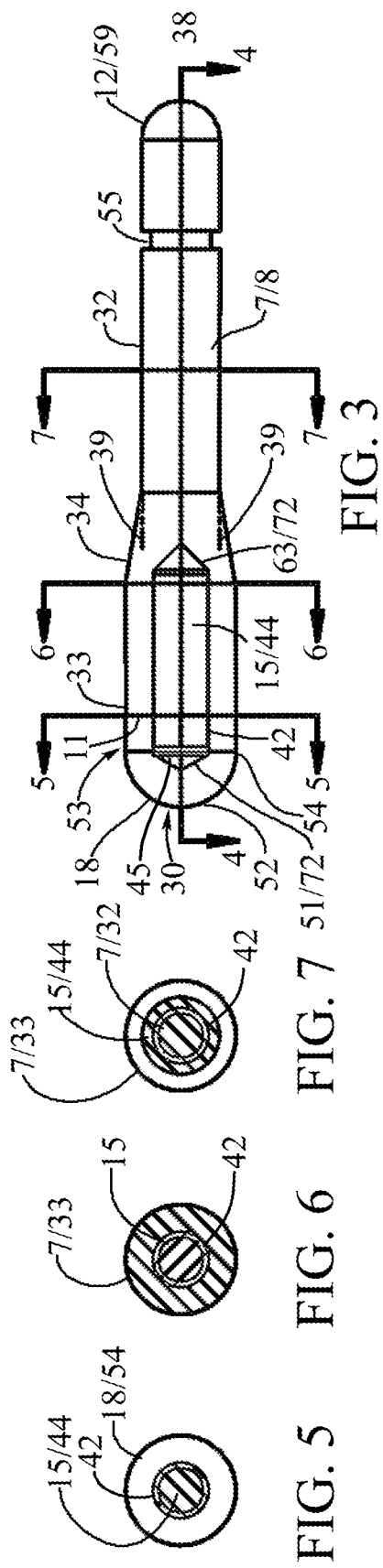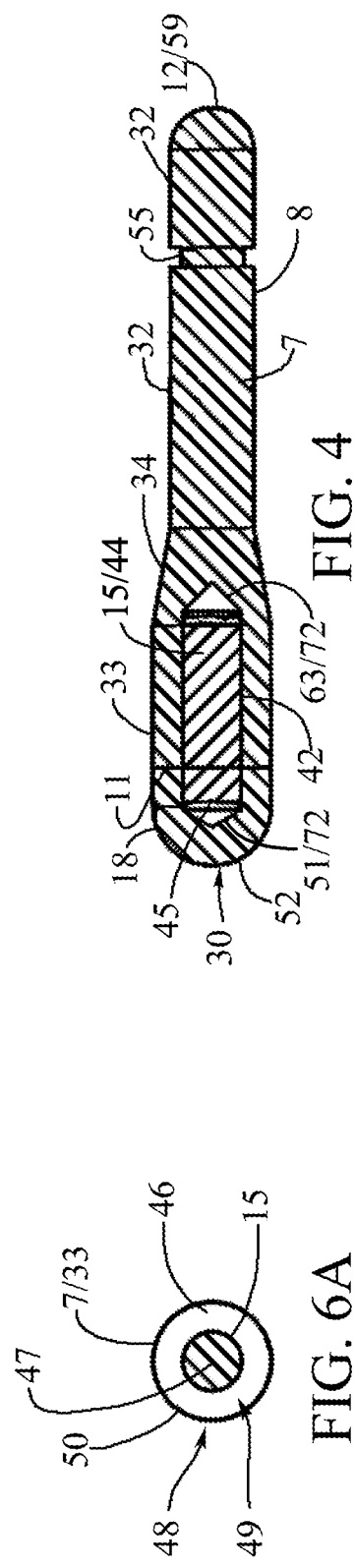

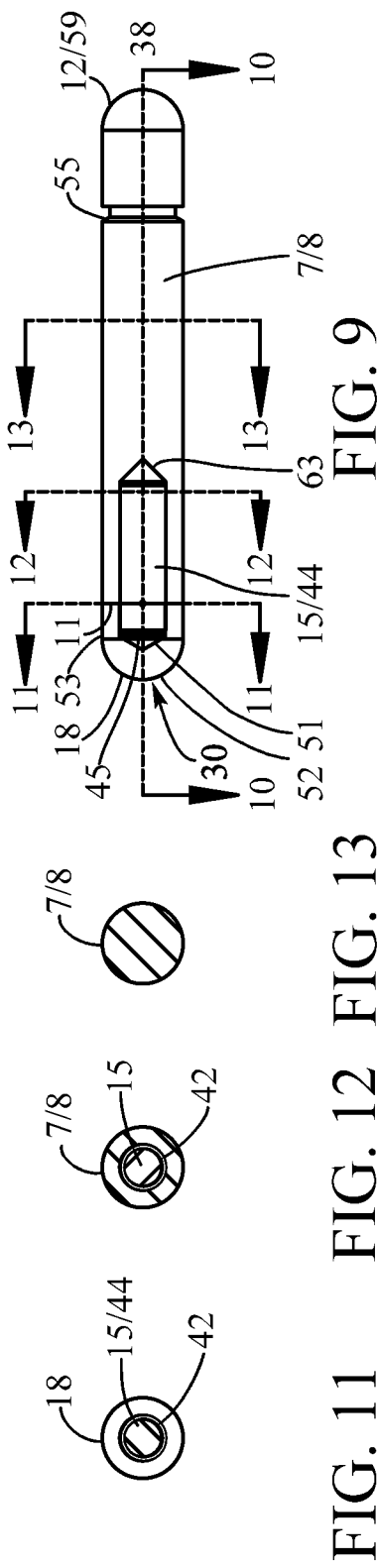

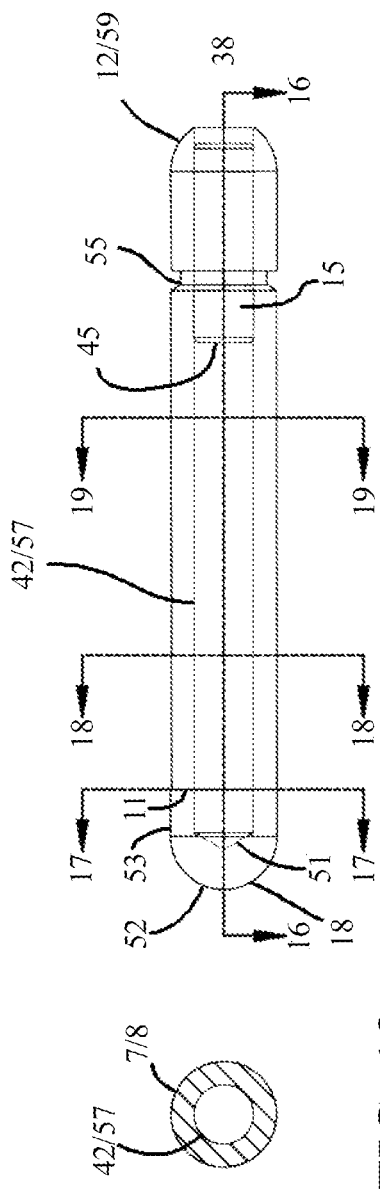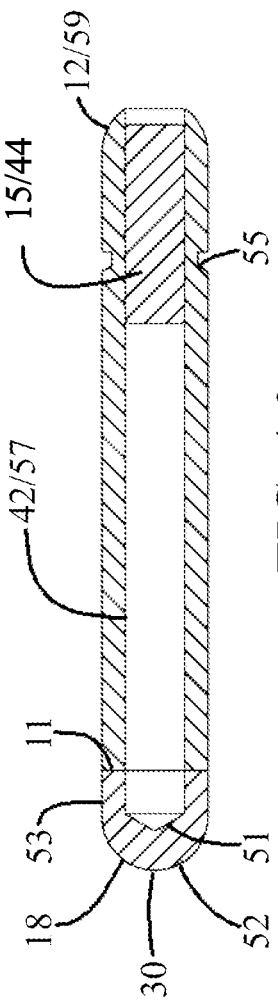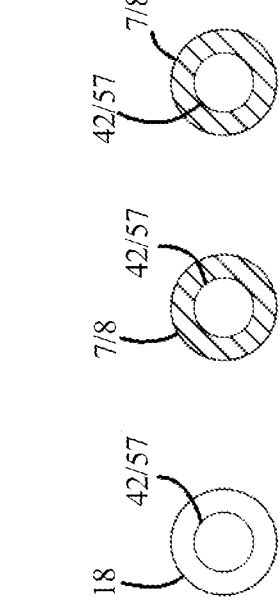
FIG. 15    FIG. 16    FIG. 17    FIG. 18    FIG. 19

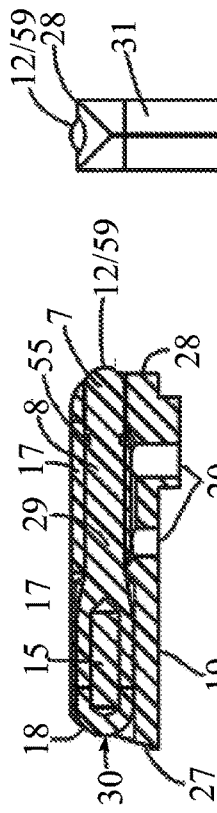
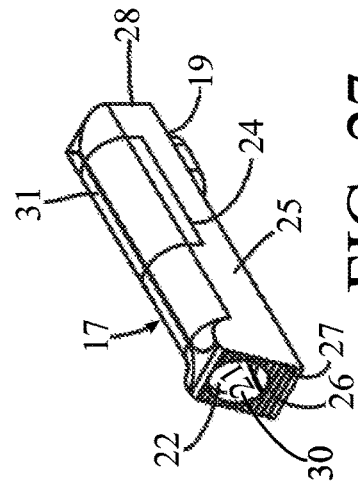
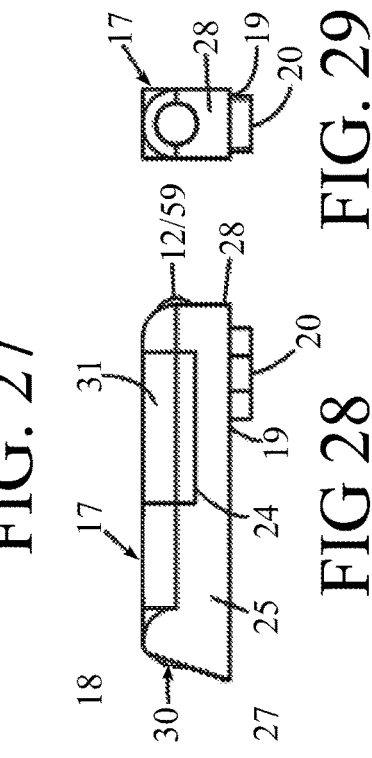
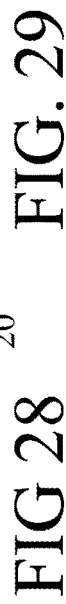
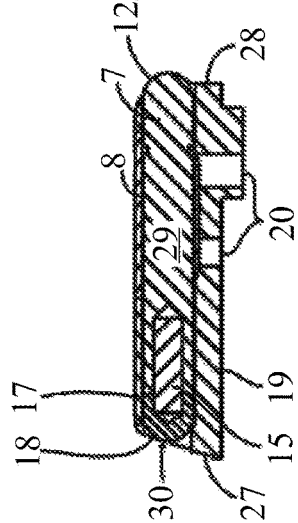
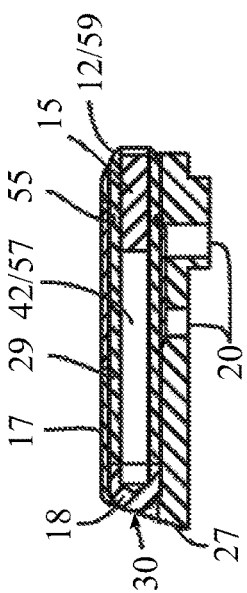
FIG. 31   FIG. 26   FIG. 27   FIG. 29
FIG. 32   FIG. 30   FIG. 28
FIG. 33

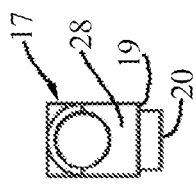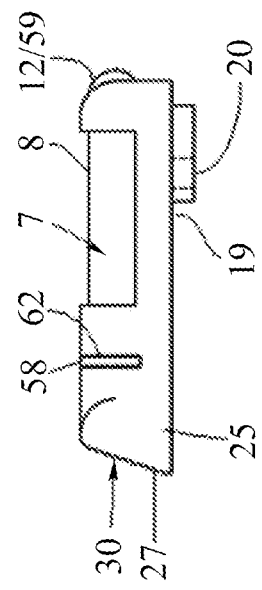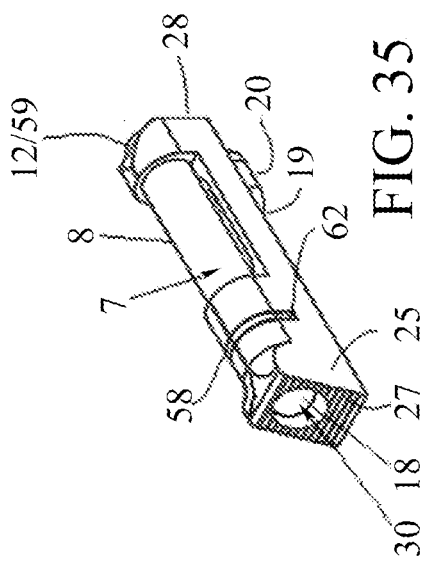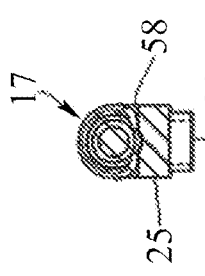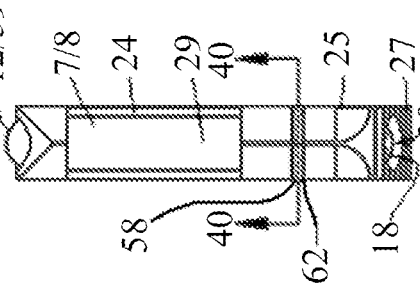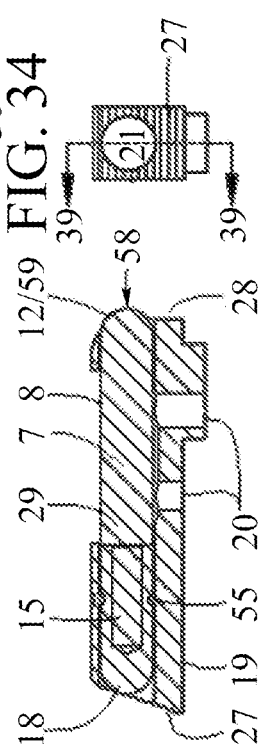

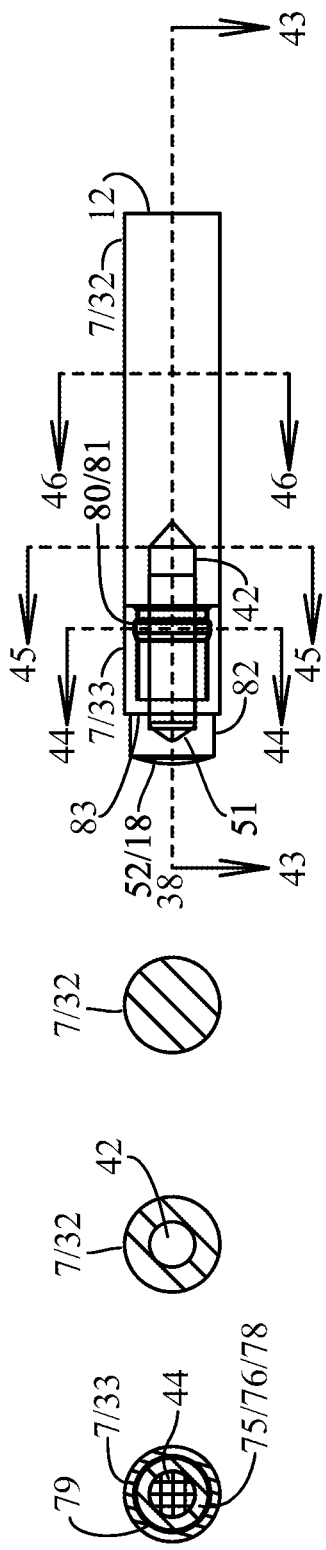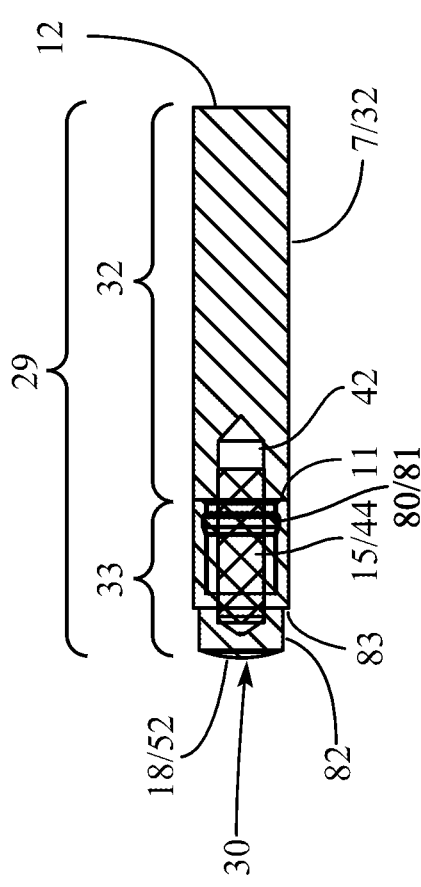
FIG. 42  FIG. 43
FIG. 44  FIG. 45  FIG. 46

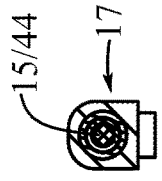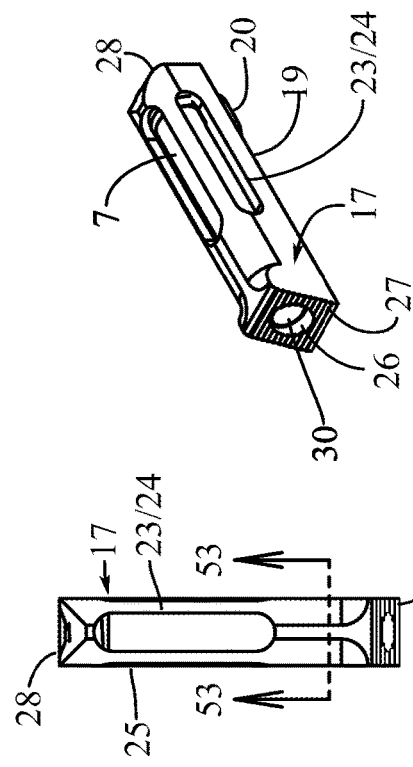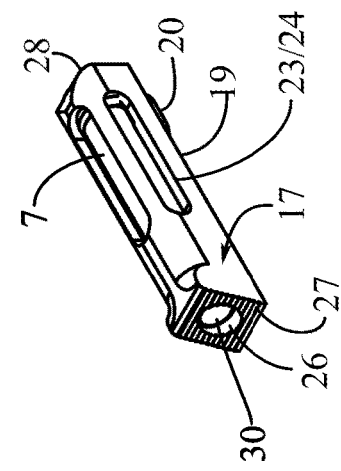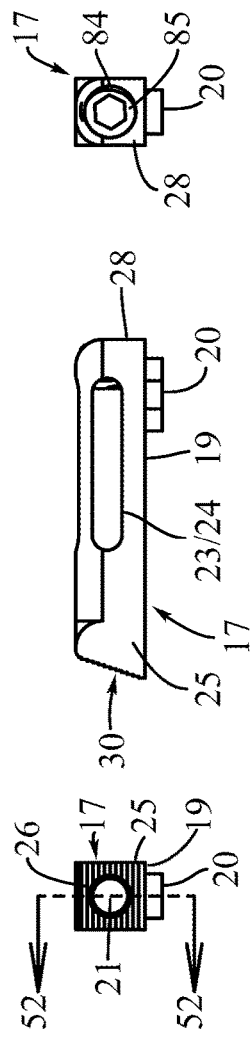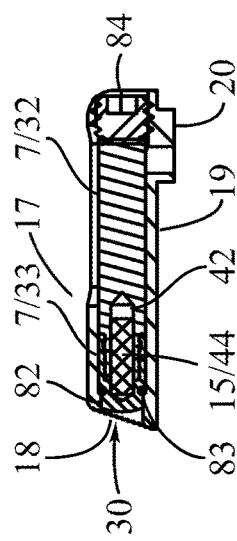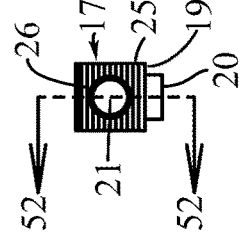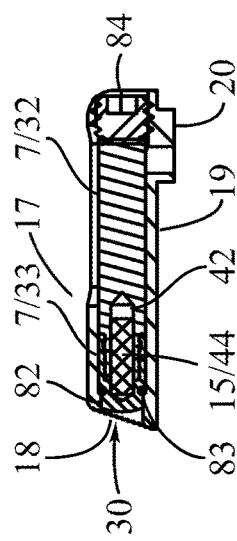

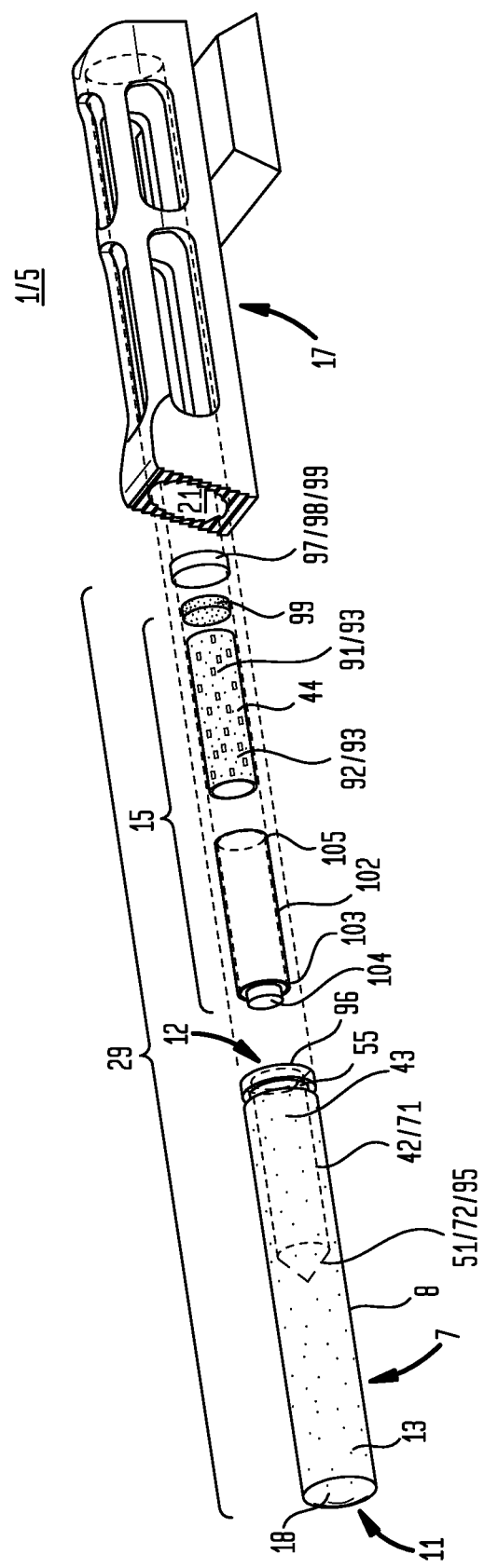

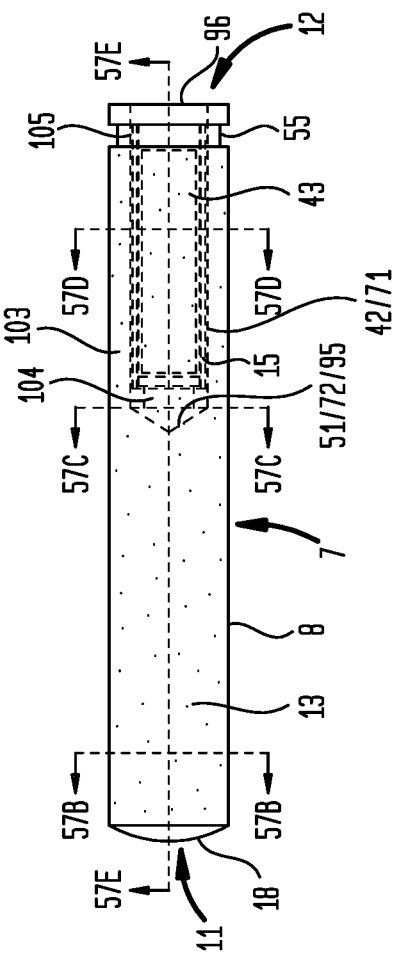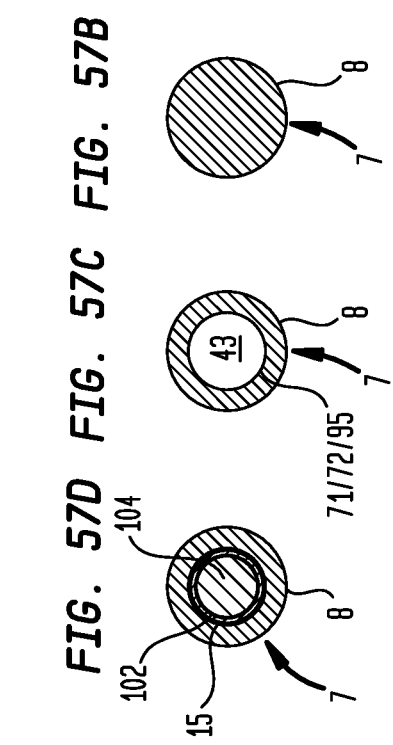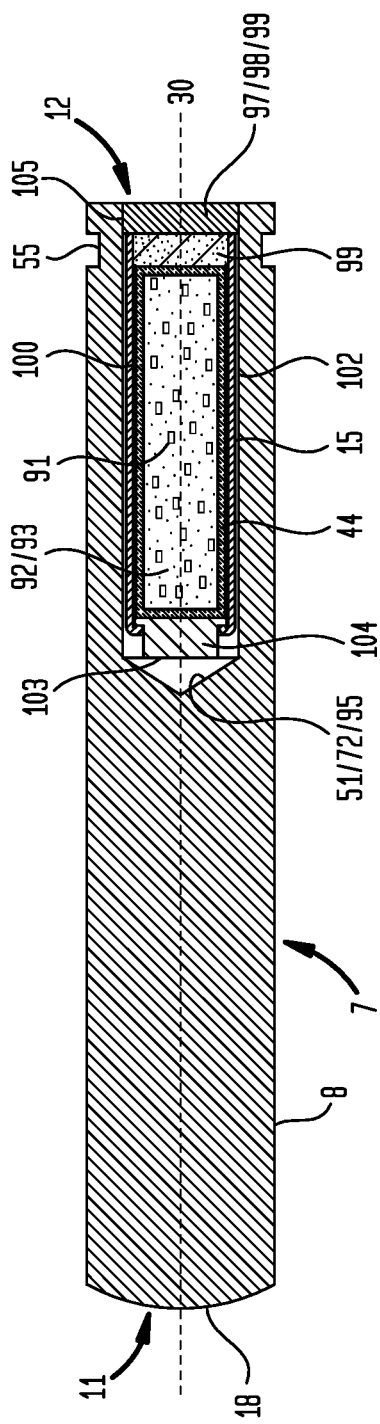

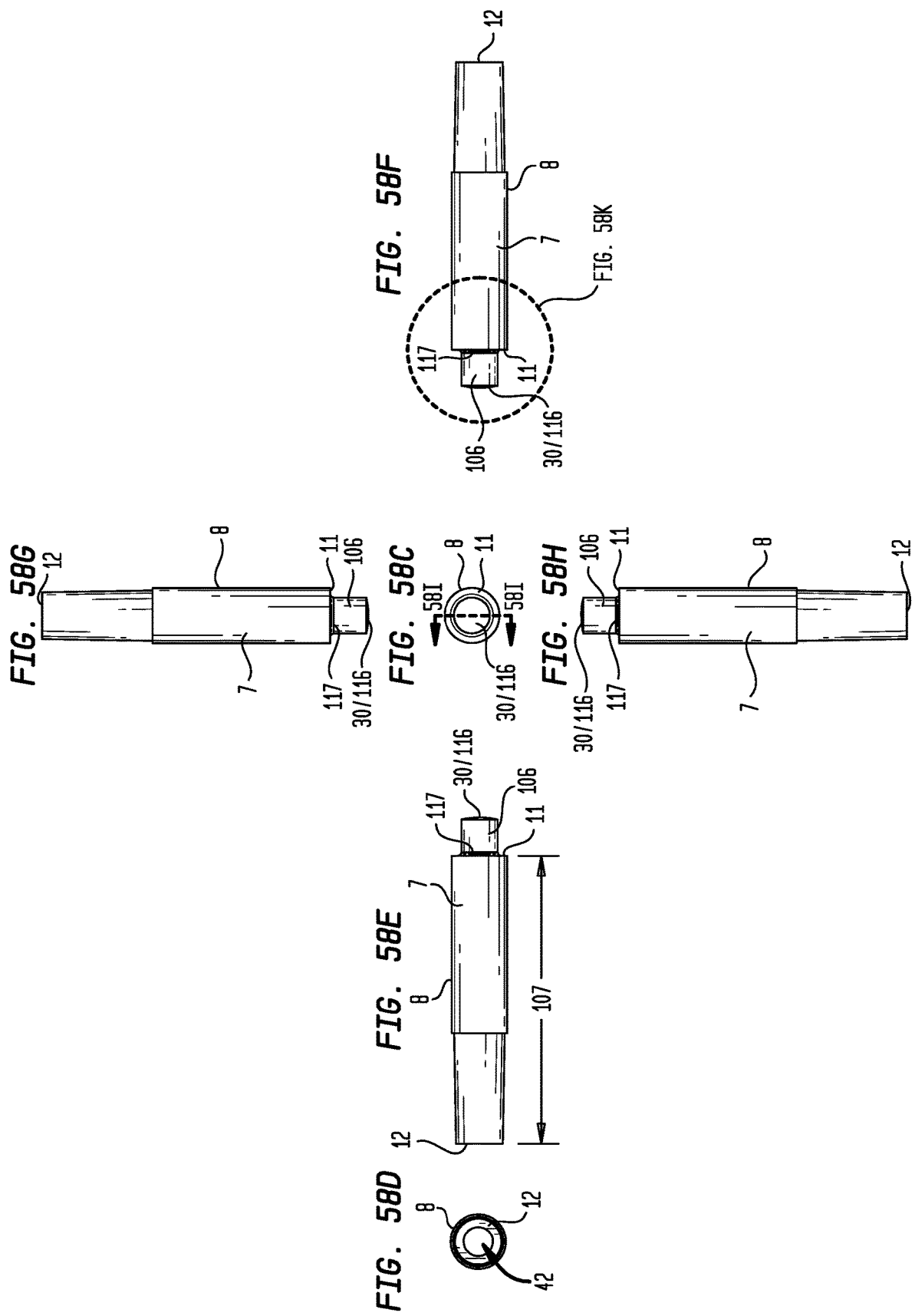

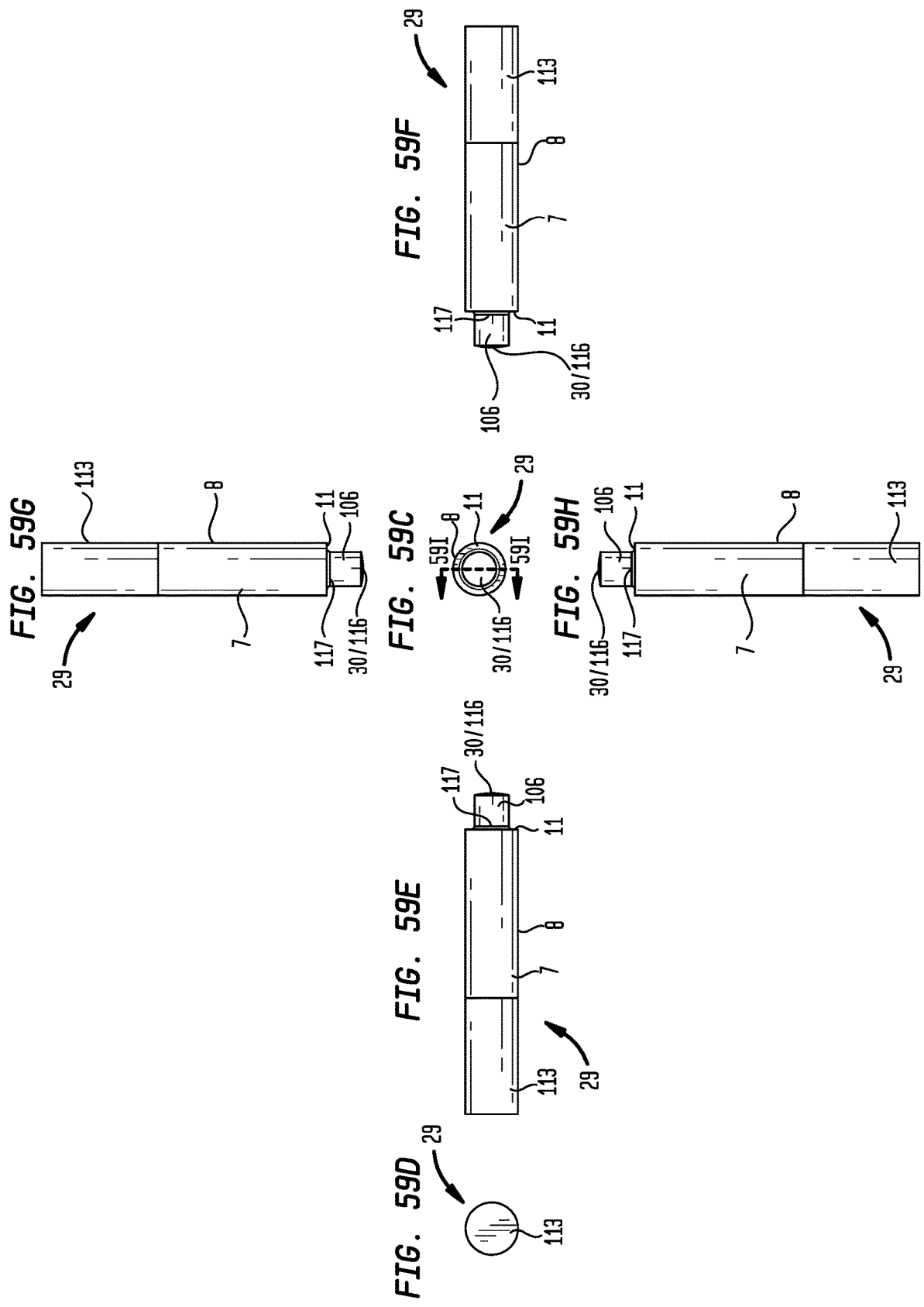

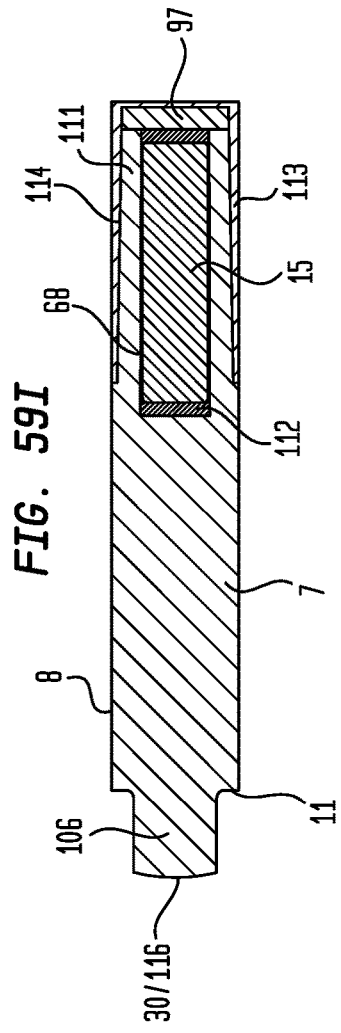
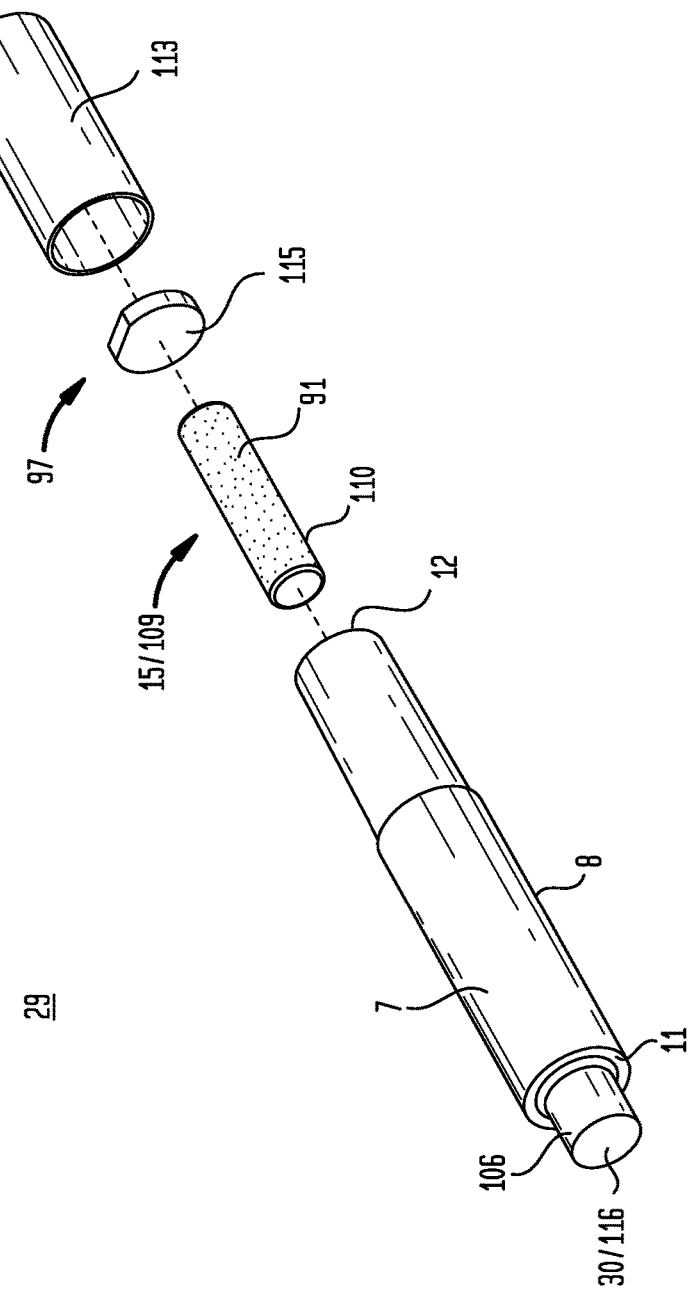
FIG. 59I
FIG. 60

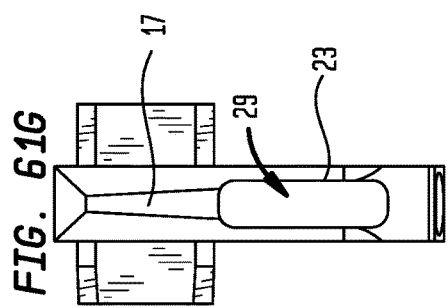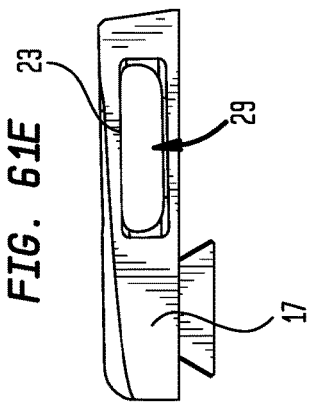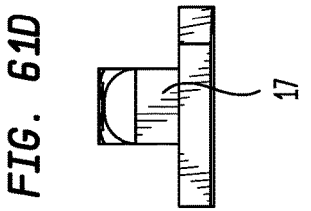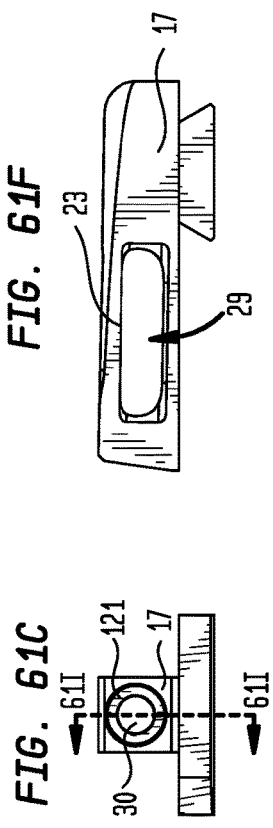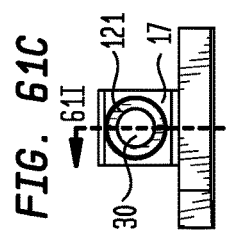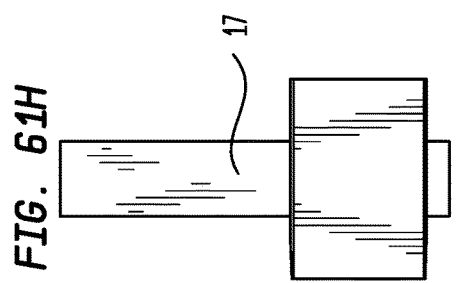

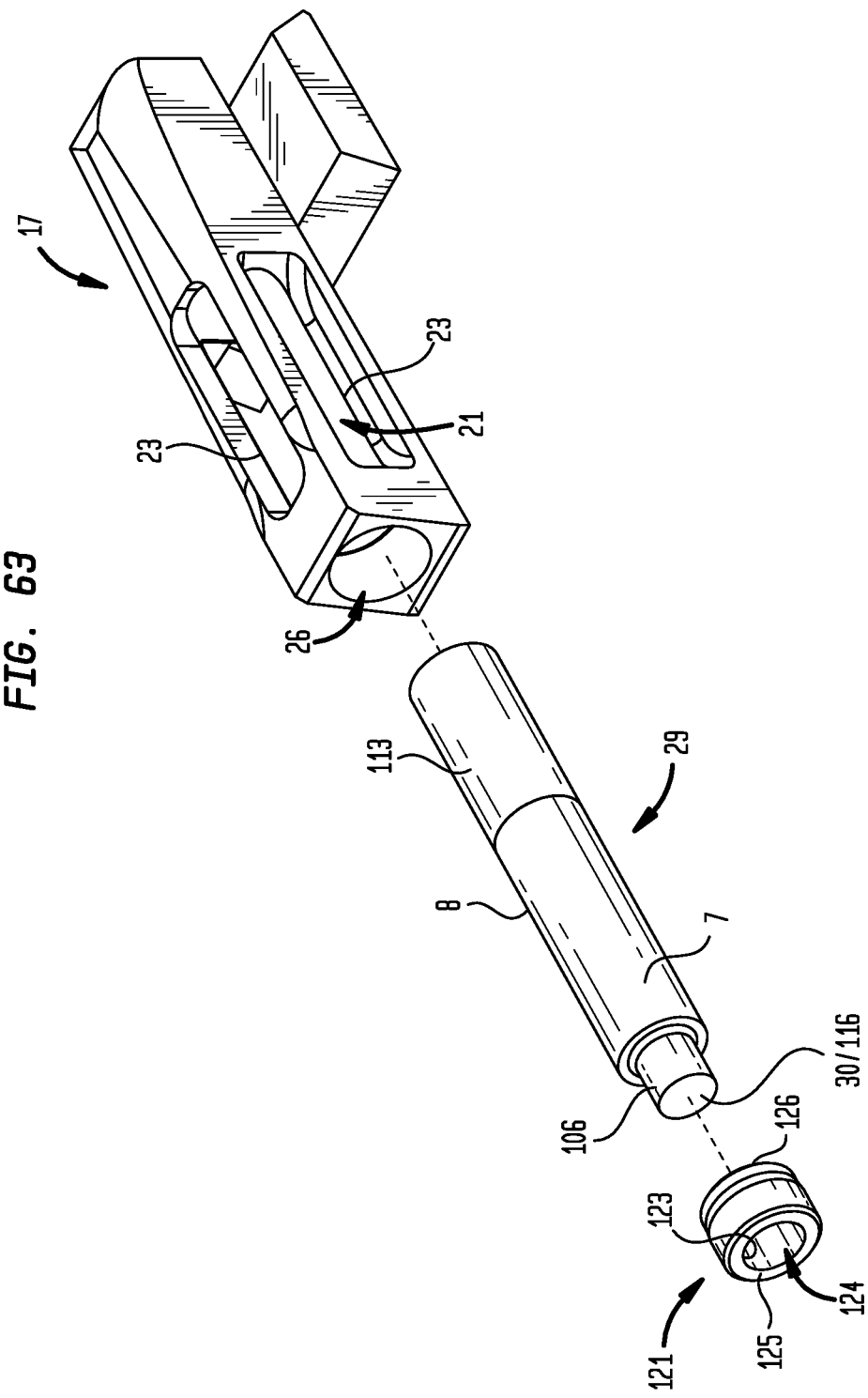

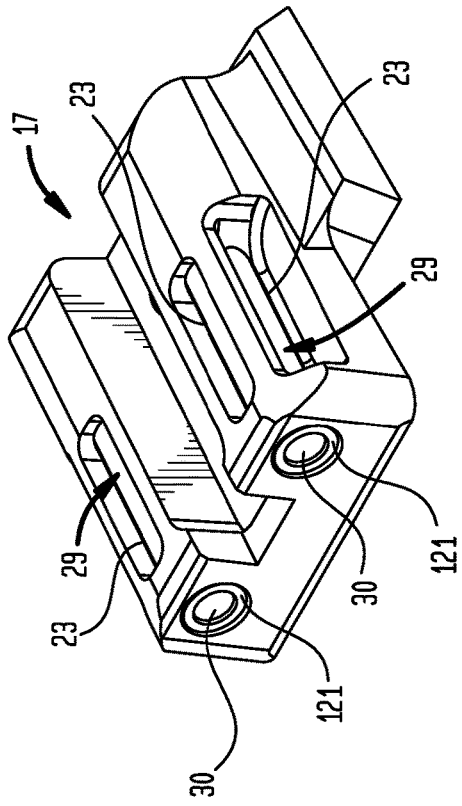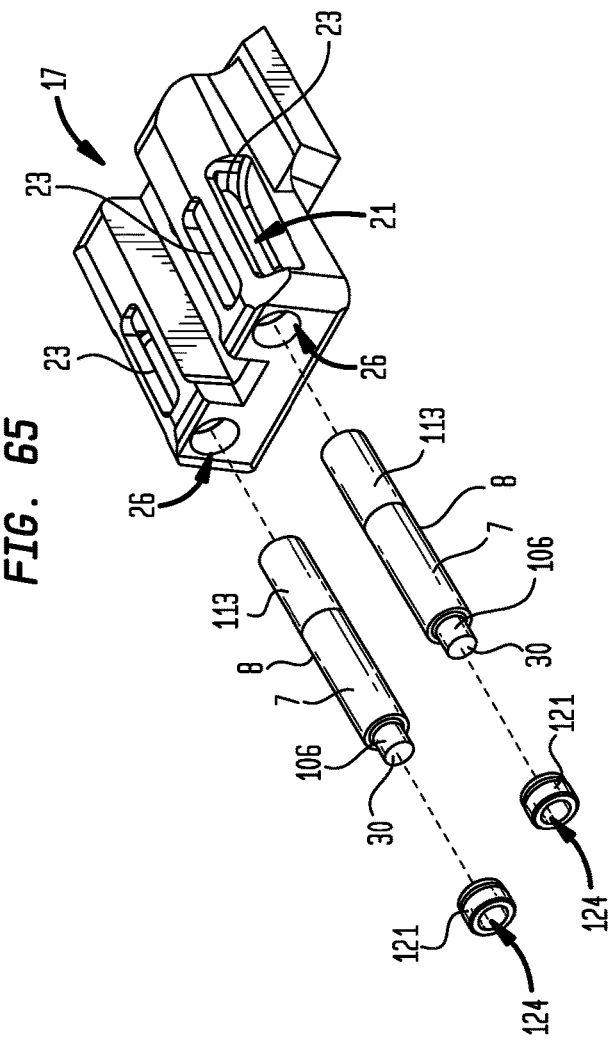

WEAPON SIGHT LIGHT EMISSION SYSTEM

This United States Patent Application is a continuation-in-part of U.S. patent application Ser. No. 14/579,846, filed Dec. 22, 2014, which is a continuation-in-part of U.S. patent application Ser. No. 13/200,628, filed Sep. 26, 2011, now U.S. Pat. No. 8,925,237, issued Jan. 6, 2015, which claims the benefit of U.S. Provisional Patent Application No. 61/459,749, filed Dec. 17, 2010, each hereby incorporated by reference herein.

I. BACKGROUND

A light emission assembly for weapon sights which provides a viewable illuminated aiming indicia of substantially fixed area and uniform brightness regardless of the ambient light conditions.

Certain conventional weapon sights use light gathering elements such as optical fiber(s), fluorescent fibers, or the like, to transmit ambient light to one or both ends to provide an aiming indicia useful in aiming a weapon. Improvements have been made over time to locate an artificial light source (such as tritium gas-filled, thin glass capsules whose inner surfaces are coated with a phosphor, light emitting diodes, or like) adjacent the external surfaces of the light gathering fibers to provide an aiming indicia useful in aiming the weapon even in low ambient light or darkness. For example, U.S. Pat. No. 6,216,352 and U.S. Pat. No. 6,122,833 each describe a sight for weapons which includes an elongated optical fiber of light gathering plastic having a first end at which light is emitted to provide an aiming indicia and location of an elongated, phosphorescent, light-emitting element disposed adjacent the outer surface of the elongated optical fiber, or as to certain embodiments, at the transverse end wall defining the second end of the elongated optical fiber.

However, there are certain disadvantages with these types of conventional weapon sights in that the installation of the light gathering element and the light emitting element in proper dimensional relation to achieve sufficient brightness of the aiming indicia can be difficult. In some cases, the light gathering element or the light emitting element can migrate due to a failure in whole or in part of the means for attaching these components to the weapon sight, such as a failure of adhesive.

Additionally, because the light emitting material often used is tritium capsule, the assembly of the tritium capsule adjacent the outer surface of the light gathering fiber may require an additional casing to enclose the assembly to obviate damage to the tritium capsule and to address safety concerns of using an uncontained a radio-isotope.

Moreover, conventional light gathering elements can have an overall length which acts to reduce the field of illumination of the aiming indicia which in turn can reduce accuracy in aiming the weapon. The longer the fiber the greater the attenuation losses, due to transmissivity, refraction, and reflection of light. As to particular conventional weapon sights which locate a tritium capsule adjacent the transverse end wall defining the second end of the elongated optical fiber, the overall length of the light gathering element becomes the sum of the light gathering element and the light emitting element which acts to further increase the overall length and acts to further exacerbate attenuation losses which reduce brightness of the field of illumination of the aiming indicia.

Additionally, the longer length of conventional light gathering elements along with the light emitting element, the shorter the sight radius (the distance between the visible part of the front sight and the visible part of the back sight). The shortened sight radius can have a detrimental effect on accuracy of aiming the weapon.

Moreover, the longer length of conventional light gathering elements can mechanically interfere with holstering the weapon or use of the weapon with other weapon paraphernalia.

The instant invention provides a weapon sight light emission assembly which overcomes in whole or in part certain of the forgoing disadvantages of conventional illuminated weapon sights.

II. SUMMARY OF THE INVENTION

A broad object of the invention can be to provide a light emission assembly for a weapon sight, and methods of making and using such a light emission assembly, whereby the light emission assembly includes a light conductive member having a light conductive member length disposed between light conductive member first and second ends; a chamber disposed inside of the light conductive member proximate the light conductive member second end, whereby the chamber can be configured to contain a light emitting element; and a light conductive protrusion axially coupled to the light conductive member proximate the light conductive member first end, whereby the light conductive protrusion terminates in a viewing end, the viewing end cross-sectional area lesser than a light conductive member first end cross-sectional area.

Another substantial object of the invention can be to provide various embodiments of a light emission assembly useful in weapon sights to provide an illuminated sight regardless of the ambient light conditions. The light emission assembly can include a light conductive member produced from light conductive material which receives light on the external surface and transmits the light to a viewable end. The light conductive member can further include a chamber in which a light emitting element can be located to emit light toward the viewable end of the light emission assembly. The light emission assembly can further provide a lens configured to define one illumination field over which the light transmitted by the light conductive material and the emitted light of the light emitting element can spread to provide a viewable aiming indicia having substantially uniform area regardless of the ambient light conditions.

Another substantial object of the invention can be to provide a numerous and wide variety of embodiments of the inventive light emission assembly each of which have a configuration that locates the light emitting element inside of the light emission assembly as opposed to locating the light emitting element adjacent the external surface whether above, below, or at an end wall.

Another substantial object of the invention can be to provide emitted light from a light emitting element which produces a first illumination pattern proximate the viewable end of a light emission assembly and transmitted light from a light conductive material which produces a second illumination pattern proximate the viewable end of the light emission assembly each of the first and second illumination patterns having areas independent of the other with the first surrounding the second which are combined and spread over one illumination field of fixed area by a lens to provide a viewable aiming indicia having substantially uniform area regardless of the ambient light conditions.

Another substantial object of the invention can be to provide a lens which convergently reflects an amount of light conducted through a light conductive member to spread over one illumination field of fixed area and divergently refracts an amount of light emitted by a light emitting element located inside of a light emission assembly to spread over the one illumination field of fixed area with the combined light spread over the one illumination field of fixed area to provide a viewable aiming indicia having substantially uniform area regardless of the ambient light conditions Another substantial object of the invention can be to provide a lens which convergently reflects an amount of light conducted through a light conductive member to spread over one illumination field of fixed area and divergently refracts an amount of light emitted by a light emitting element located inside of a light emission assembly to spread over the one illumination field of fixed area both the amount of light convergently reflected onto the illumination field and the amount of light divergently reflected onto the illumination field affording substantially the same viewing angle.

Naturally, further objects of the invention are disclosed throughout other areas of the specification, drawings, photographs, and claims.

III. A BRIEF DESCRIPTION OF THE DRAWINGS

FIG. 3 is a side view of a particular embodiment of the light emission assembly of the front sight shown in FIG. 2.

FIG. 4 is a longitudinal cross section 4-4 of the particular light emission assembly shown in FIG. 3.

FIG. 5 is a transverse cross section 5-5 of the particular light emission assembly shown in FIG. 3.

FIG. 6 is a transverse cross section 6-6 of the particular light emission assembly shown in FIG. 3.

FIG. 6A is a transverse cross section 6-6 of the particular light emission assembly shown in FIG. 3 which shows a first illumination pattern in the form of an annular area surrounding a second illumination pattern in the form of a circular area.

FIG. 7 is a transverse cross section 7-7 of the particular light emission assembly shown in FIG. 3.

FIG. 9 is a side view of the particular embodiment of the light emission assembly of the front sight shown in FIG. 8.

FIG. 10 is a longitudinal cross section 10-10 of the particular light emission assembly shown in FIG. 8.

FIG. 11 is a transverse cross section 11-11 of the particular light emission assembly shown in FIG. 9.

FIG. 12 is a transverse cross section 12-12 of the particular light emission assembly shown in FIG. 9.

FIG. 13 is a transverse cross section 13-13 of the particular light emission assembly shown in FIG. 9.

FIG. 15 is a side view of a particular embodiment of the light emission assembly of the front sight shown in FIG. 14.

FIG. 16 is a longitudinal cross section 16-16 of the particular light emission assembly shown in FIG. 15.

FIG. 17 is a transverse cross section 17-17 of the particular light emission assembly shown in FIG. 15.

FIG. 18 is a transverse cross section 18-18 of the particular light emission assembly shown in FIG. 15.

FIG. 19 is a transverse cross section 19-19 of the particular light emission assembly shown in FIG. 15.

FIG. 21 is a side view of a particular embodiment of the light emission assembly of the front sight shown in FIG. 20.

FIG. 22 is a longitudinal cross section 22-22 of the particular light emission assembly shown in FIG. 21.

FIG. 26 is a top view of a particular embodiment of the front sight of the inventive weapon sight.

FIG. 27 is a perspective view of the particular embodiment of the front sight of the inventive weapon sight of FIG. 26.

FIG. 28 is a side view of the particular embodiment of the front sight of the inventive weapon sight of FIG. 26.

FIG. 29 is a rear view of the particular embodiment of the front sight of the inventive weapon sight of FIG. 26.

FIG. 30 is a front view of the particular embodiment of the front sight of the inventive weapon sight of FIG. 26.

FIG. 31 is a longitudinal cross section view of the particular embodiment of the front sight of FIG. 30 including the embodiment of the light emission assembly of FIGS. 2-7.

FIG. 32 is a longitudinal cross section view of the particular embodiment of the front sight of FIG. 30 including the embodiment of the light emission assembly of FIGS. 8-13.

FIG. 33 is a longitudinal cross section view of the particular embodiment of the front sight of FIG. 30 including the embodiment of the light emission assembly of FIGS. 14-16.

FIG. 34 is a top view of another particular embodiment of the front sight of the inventive weapon sight.

FIG. 35 is a perspective view of the particular embodiment of the front sight of the inventive weapon sight of FIG. 34.

FIG. 36 is a side view of the particular embodiment of the front sight of the inventive weapon sight of FIG. 34.

FIG. 37 is a rear view of the particular embodiment of the front sight of the inventive weapon sight of FIG. 34.

FIG. 38 is a front view of the particular embodiment of the front sight of the inventive weapon sight of FIG. 34.

FIG. 39 is a longitudinal cross section view of the particular embodiment of the front sight of FIG. 38 including the embodiment of the light emission assembly of FIGS. 8-13.

FIG. 40 is a transverse cross section view 40-40 of the particular embodiment of the front sight of FIG. 34 including the embodiment of the light emission assembly of FIGS. 8-13.

FIG. 42 is a side view of a particular embodiment of the light emission assembly of the front sight shown in FIG. 41.

FIG. 43 is a longitudinal cross section 45-45 of the particular light emission assembly shown in FIG. 42.

FIG. 44 is a transverse cross section 46-46 of the particular light emission assembly shown in FIG. 42.

FIG. 45 is a transverse cross section 47-47 of the particular light emission assembly shown in FIG. 42.

FIG. 46 is a transverse cross section 48-48 of the particular light emission assembly shown in FIG. 42.

FIG. 47 is a top view of a particular embodiment of the front sight of the inventive weapon sight show in FIG. 41.

FIG. 48 is a perspective view of the particular embodiment of the front sight of the inventive weapon sight of FIG. 41.

FIG. 49 is a side view of the particular embodiment of the front sight of the inventive weapon sight of FIG. 48.

FIG. 50 is a rear view of the particular embodiment of the front sight of the inventive weapon sight of FIG. 48.

FIG. 51 is a front view of the particular embodiment of the front sight of the inventive weapon sight of FIG. 48.

FIG. 52 is a longitudinal cross section 52-52 of the particular embodiment of the front sight of FIG. 51 including the embodiment of the light emission assembly of FIGS. 42-46.

FIG. 53 is a latitudinal cross section 53-53 of the particular embodiment of the front sight of FIG. 47 including the embodiment of the light emission assembly of FIGS. 42-46.

Figure 54:
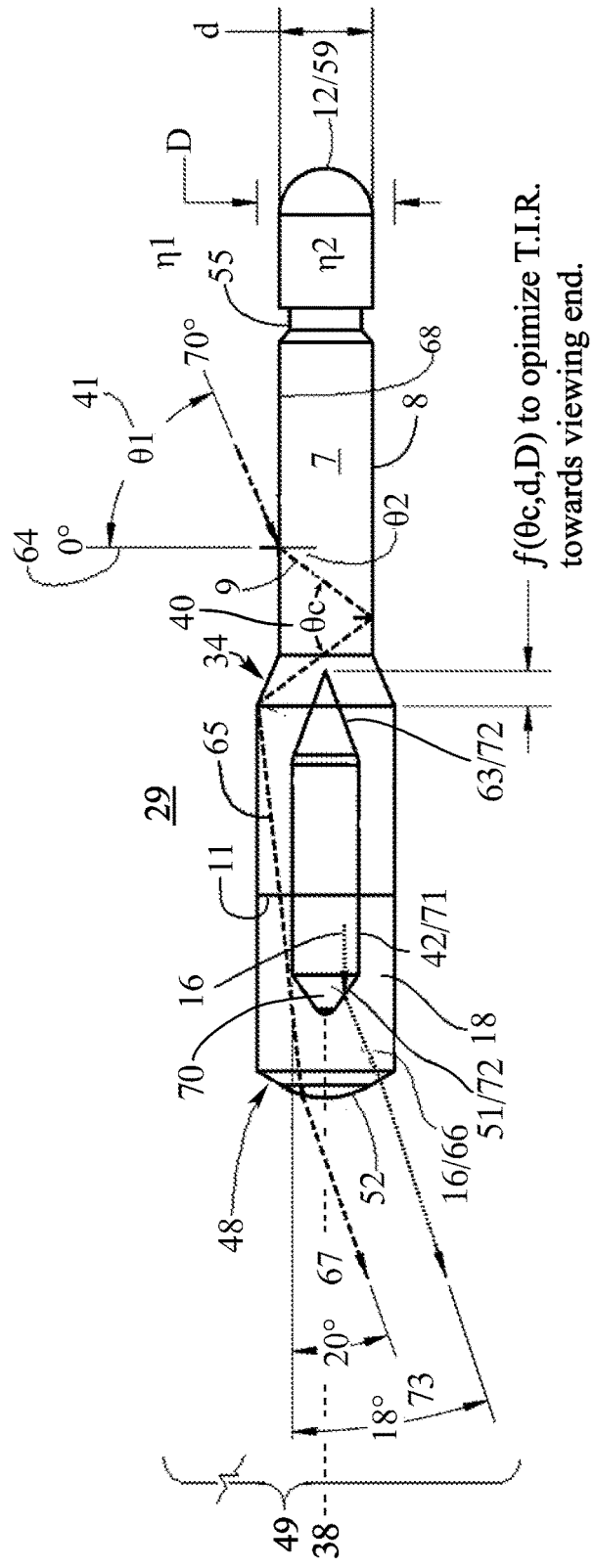

FIG. 54 is a side view of the particular embodiment of the light emission assembly of FIGS. 2-7 which illustrates the transmission of light within the light conductive member and lens including light emitted from a light emitting source having a location within the light conductive member and of light incident upon the external surface of the light conductive member transmitted to the viewing end of the light emission assembly.

Figure 41:
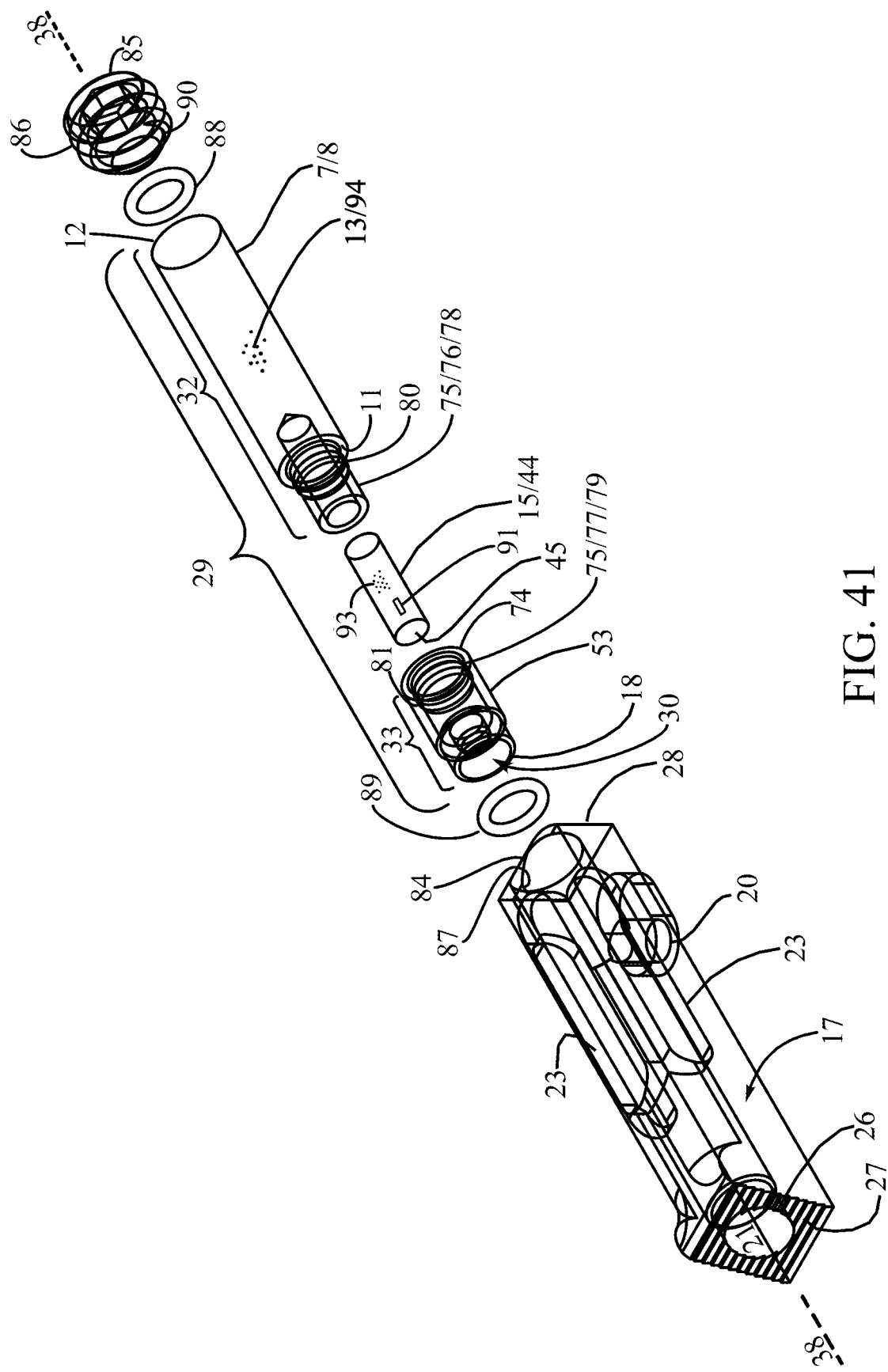
FIG. 41 is an exploded perspective view of another particular embodiment of the front sight of the inventive weapon sight.
Figure 55:
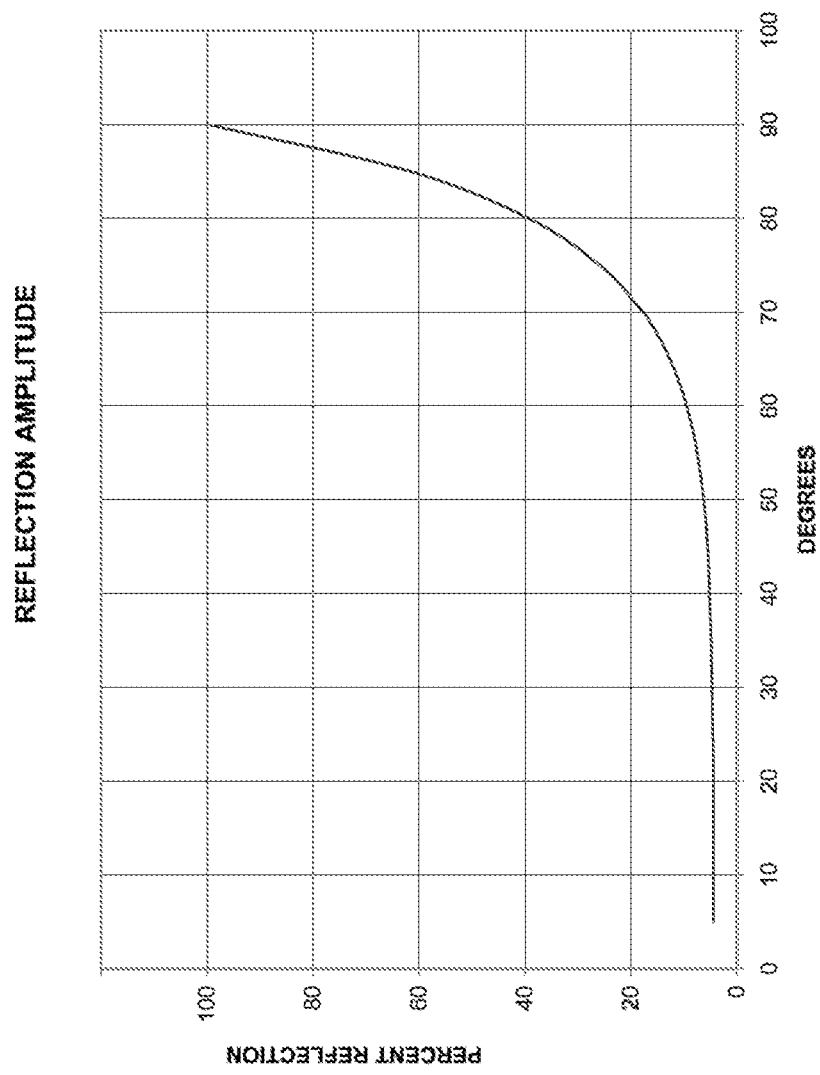

FIG. 55 is a graph which shows increase in percent external reflectance in relation to angle of light incidence on the external surface of the embodiment of the light conductive member of FIGS. 2-7 between 0° and 70° as shown in FIG. 41.

FIG. 56 is an exploded perspective view of an embodiment of the front sight of the inventive weapon sight.

FIG. 57A is a side view of the light conductive member shown in FIG. 56.

FIG. 57B is cross section view 57B-57B shown in FIG. 57A.

FIG. 57C is cross section view 57C-57C shown in FIG. 57A.

FIG. 57D is cross section view 57D-57D shown in FIG. 57A.

FIG. 57E is cross section view 57E-57E shown in FIG. 57A.

Figure 58A:
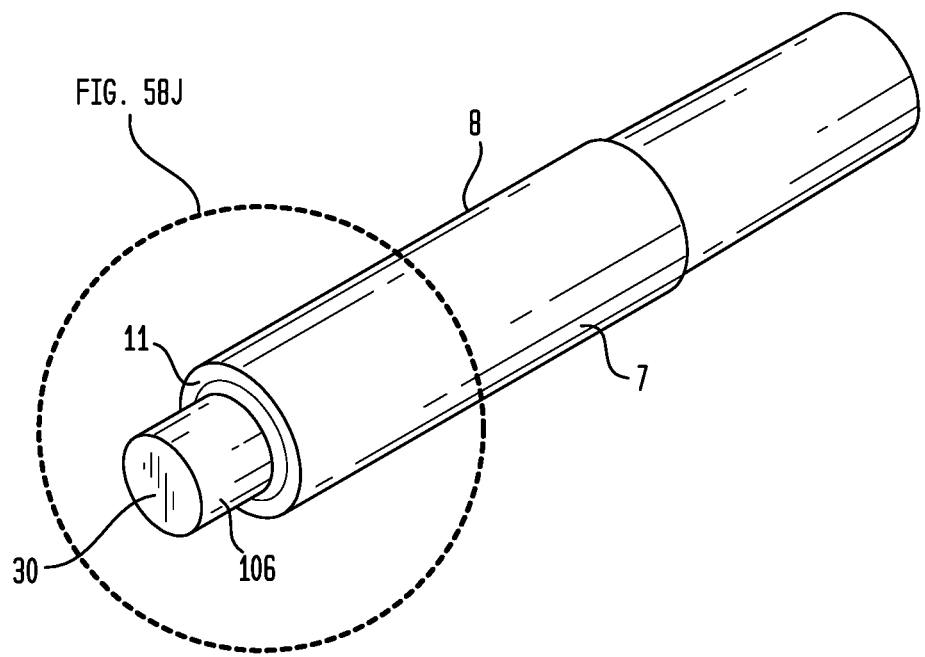

FIG. 58A is a front perspective view of a particular embodiment of a light conductive member of the light emission assembly.

Figure 58B:
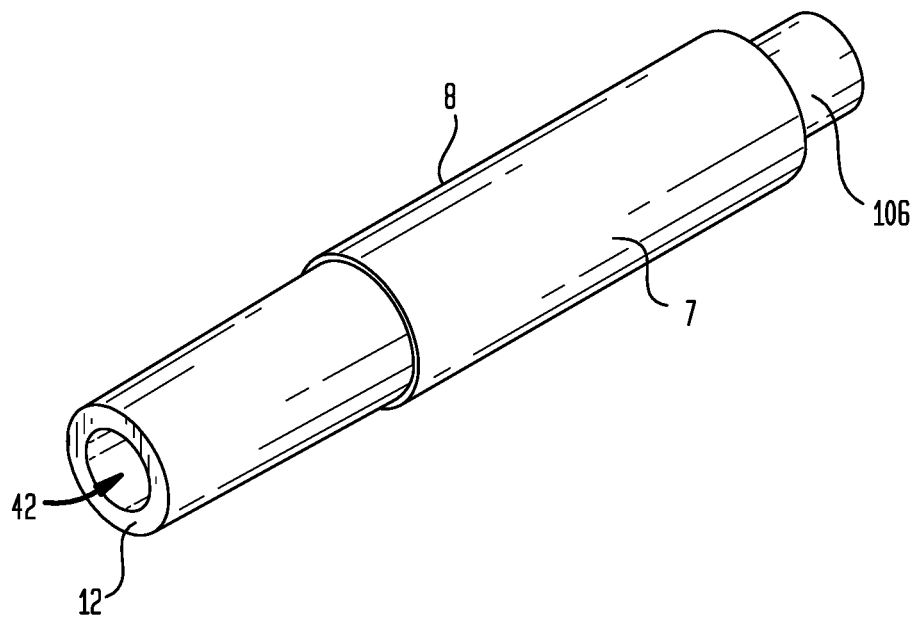

FIG. 58B is a rear perspective view of the particular embodiment of the light conductive member shown in FIG. 58A.

FIG. 58C is a first end view of the particular embodiment of the light conductive member shown in FIG. 58A.

FIG. 58D is a second end view of the particular embodiment of the light conductive member shown in FIG. 58A.

FIG. 58E is a first side view of the particular embodiment of the light conductive member shown in FIG. 58A.

FIG. 58F is a second side view of the particular embodiment of the light conductive member shown in FIG. 58A.

FIG. 58G is a top view of the particular embodiment of the light conductive member shown in FIG. 58A.

FIG. 58H is a bottom view of the particular embodiment of the light conductive member shown in FIG. 58A.

Figure 58I:
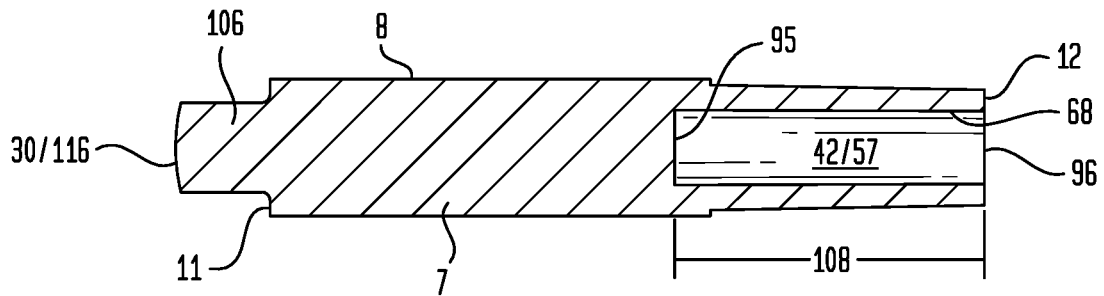

FIG. 58I is cross section view 58I-58I of the particular embodiment of the light conductive member shown in FIG. 58C.

Figure 58J:
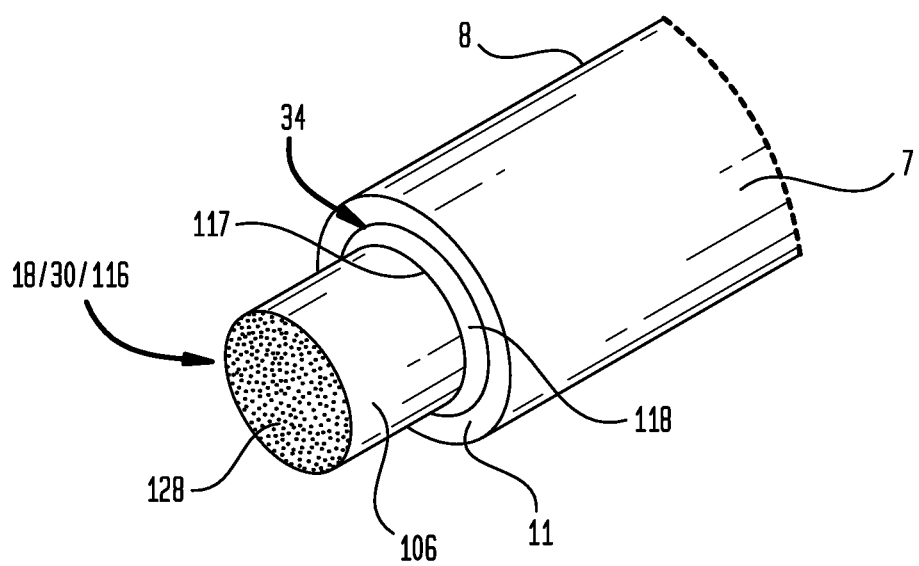

FIG. 58J is an enlarged view of the particular embodiment of the light conductive member shown in FIG. 58A.

Figure 58K:
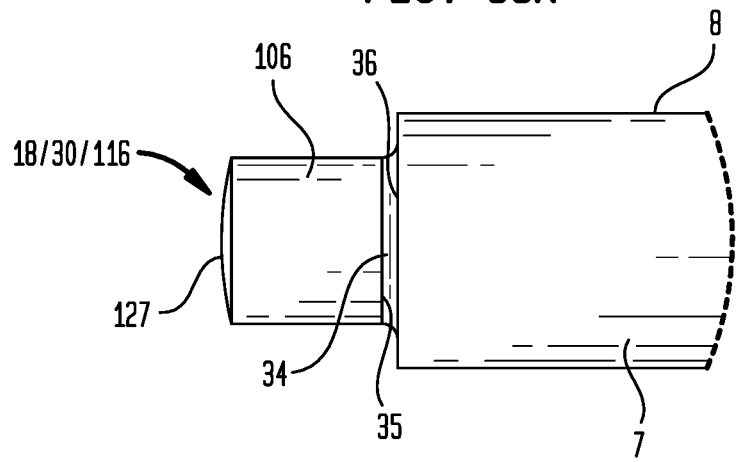

FIG. 58K is an enlarged view of the particular embodiment of the light conductive member shown in FIG. 58F.

Figure 59A:
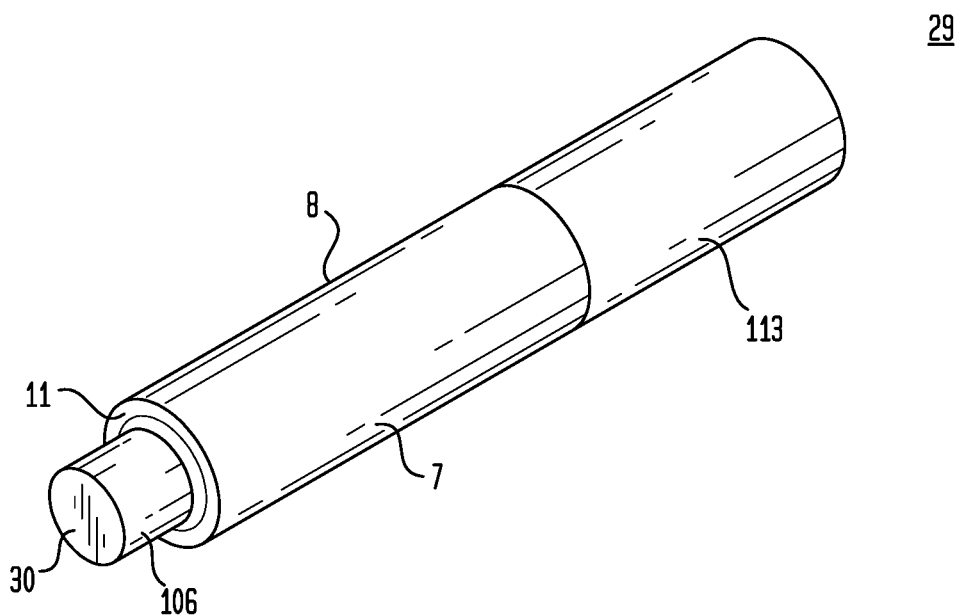

FIG. 59A is a front perspective view of a particular embodiment of the light emission assembly.

Figure 59B:
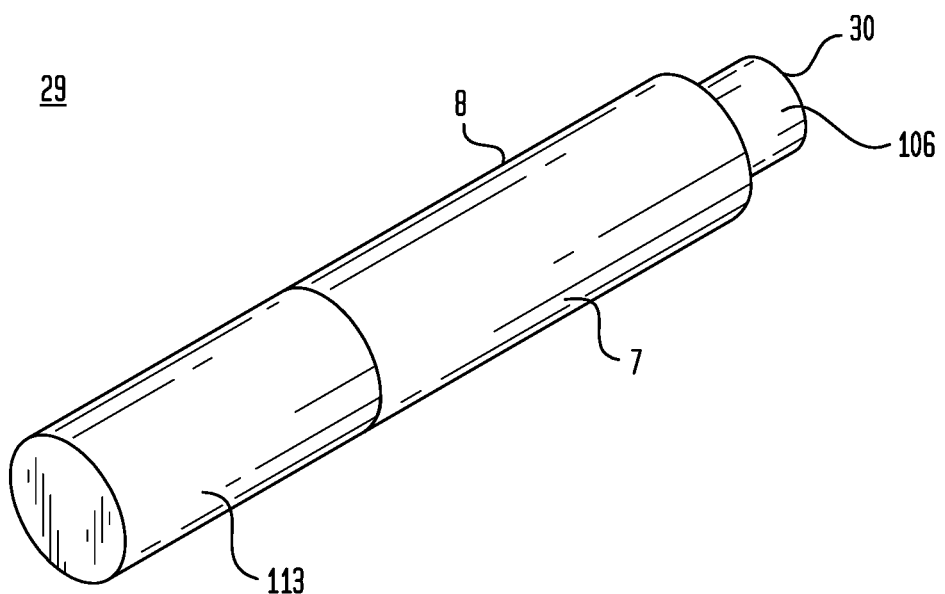

FIG. 59B is a rear perspective view of the particular embodiment of the light emission assembly shown in FIG. 59A.

FIG. 59C is a first end view of the particular embodiment of the light emission assembly shown in FIG. 59A.

FIG. 59D is a second end view of the particular embodiment of the light emission assembly shown in FIG. 59A.

FIG. 59E is a first side view of the particular embodiment of the light emission assembly shown in FIG. 59A.

FIG. 59F is a second side view of the particular embodiment of the light emission assembly shown in FIG. 59A.

FIG. 59G is a top view of the particular embodiment of the light emission assembly shown in FIG. 59A.

FIG. 59H is a bottom view of the particular embodiment of the light emission assembly shown in FIG. 59A.

FIG. 59I is cross section view 59I-59I of the particular embodiment of the light emission assembly shown in FIG. 59C.

FIG. 60 is an exploded view of a particular embodiment of the light emission assembly.

Figure 61A:
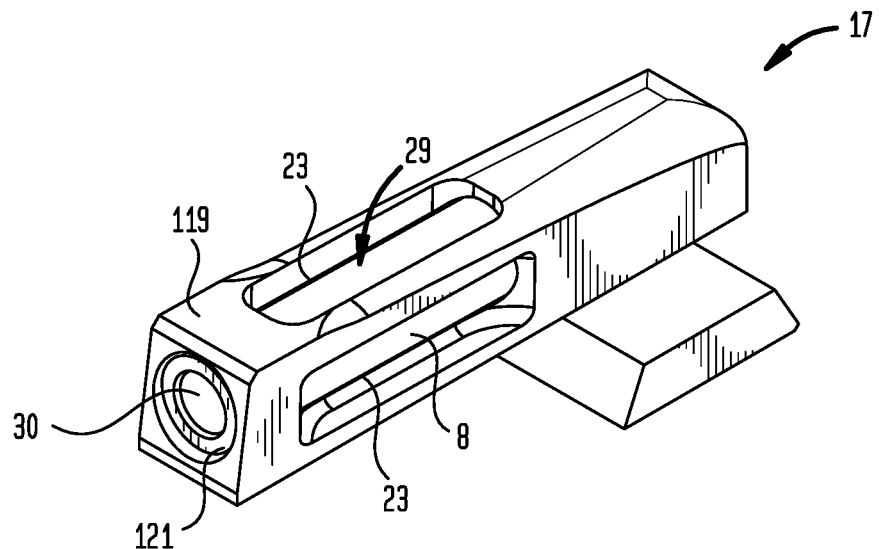

FIG. 61A is a front perspective view of a particular embodiment of the light emission assembly disposed within a base.

Figure 61B:
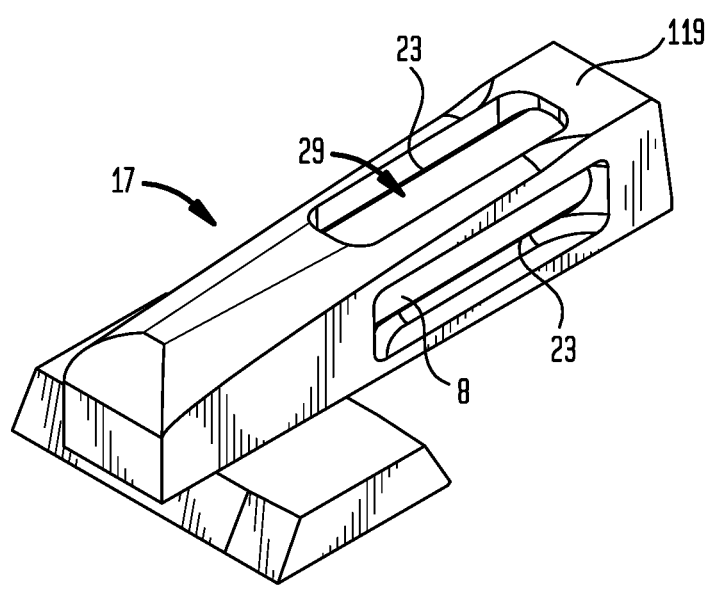

FIG. 61B is a rear perspective view of the particular embodiment of the light emission assembly disposed within the base shown in FIG. 61A.

FIG. 61C is a first end view of the particular embodiment of the light emission assembly disposed within the base shown in FIG. 61A.

FIG. 61D is a second end view of the particular embodiment of the light emission assembly disposed within the base shown in FIG. 61A.

FIG. 61E is a first side view of the particular embodiment of the light emission assembly disposed within the base shown in FIG. 61A.

FIG. 61F is a second side view of the particular embodiment of the light emission assembly disposed within the base shown in FIG. 61A.

FIG. 61G is a top view of the particular embodiment of the light emission assembly disposed within the base shown in FIG. 61A.

FIG. 61H is a bottom view of the particular embodiment of the light emission assembly disposed within the base shown in FIG. 61A.

Figure 61I:
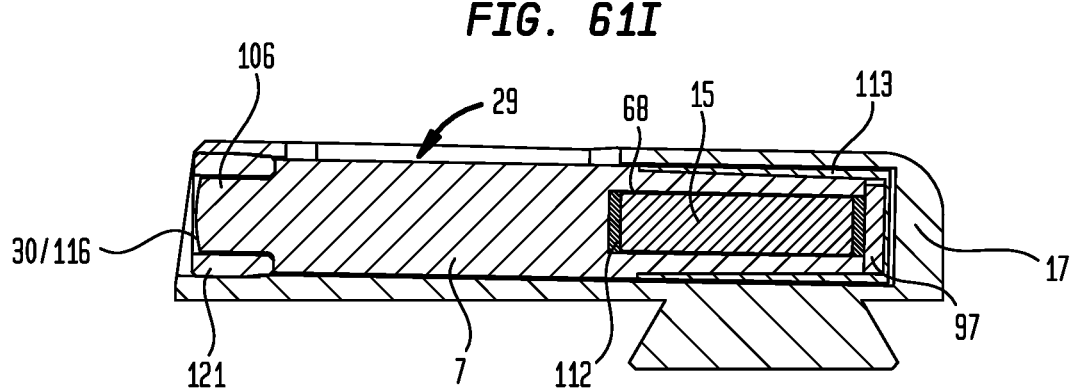

FIG. 61I is a cross section view 61I-61I of the particular embodiment of the light emission assembly disposed within the base shown in FIG. 61C.

Figure 61J:
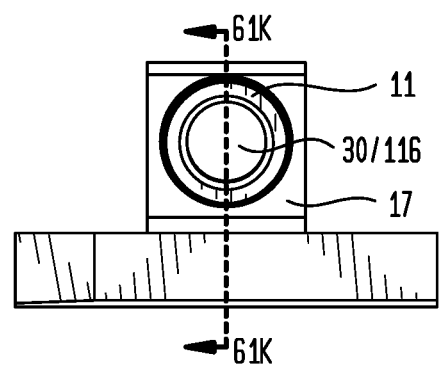

FIG. 61J is a first end view of the particular embodiment of the light emission assembly disposed within the base shown in FIG. 61A, but without the annular fastener disposed within the annular space.

Figure 61K:
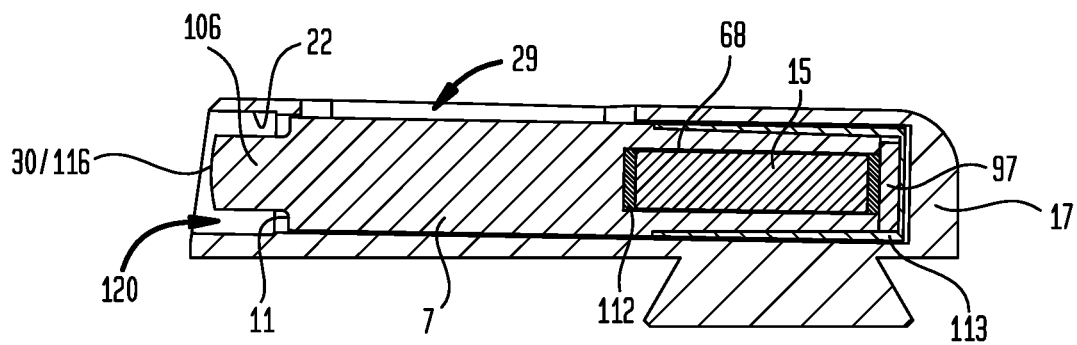

FIG. 61K is a cross section view 61K-61K of the particular embodiment of the light emission assembly disposed within the base shown in FIG. 61J.

Figure 62A:
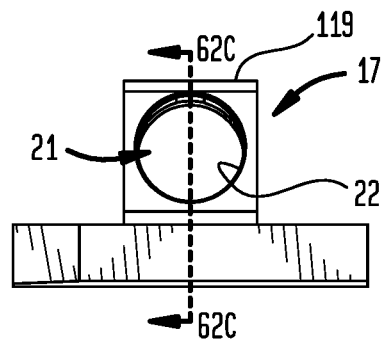

FIG. 62A is a first end view of a particular embodiment of a base.

Figure 62B:
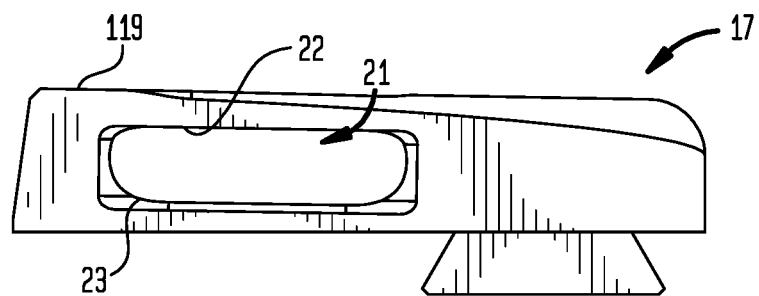

FIG. 62B is a second side view of the particular embodiment of the base shown in FIG. 62A.

Figure 62C:
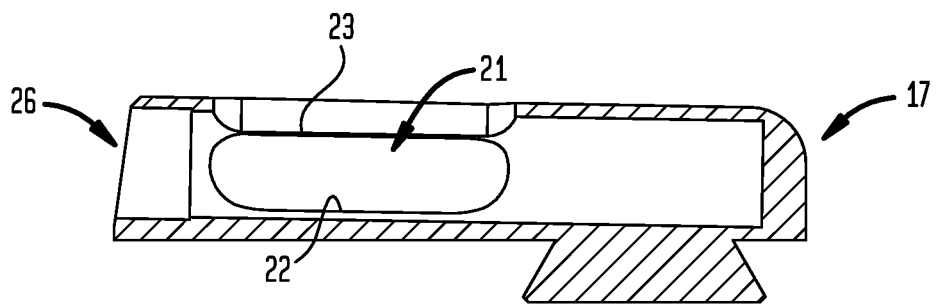

FIG. 62C is a cross section view 62C-62C of the particular embodiment of the base shown in FIG. 62A.

FIG. 63 is an exploded view of a particular embodiment of the light emission assembly, a base, and an annular fastener.

FIG. 64 is a front perspective view of a particular embodiment of two light emission assemblies disposed within a base.

FIG. 65 is an exploded view of a particular embodiment of two light emission assemblies disposed within a base, and two corresponding annular fasteners.

IV. DETAILED DESCRIPTION OF THE PREFERRED EMBODIMENTS

Figure 1:
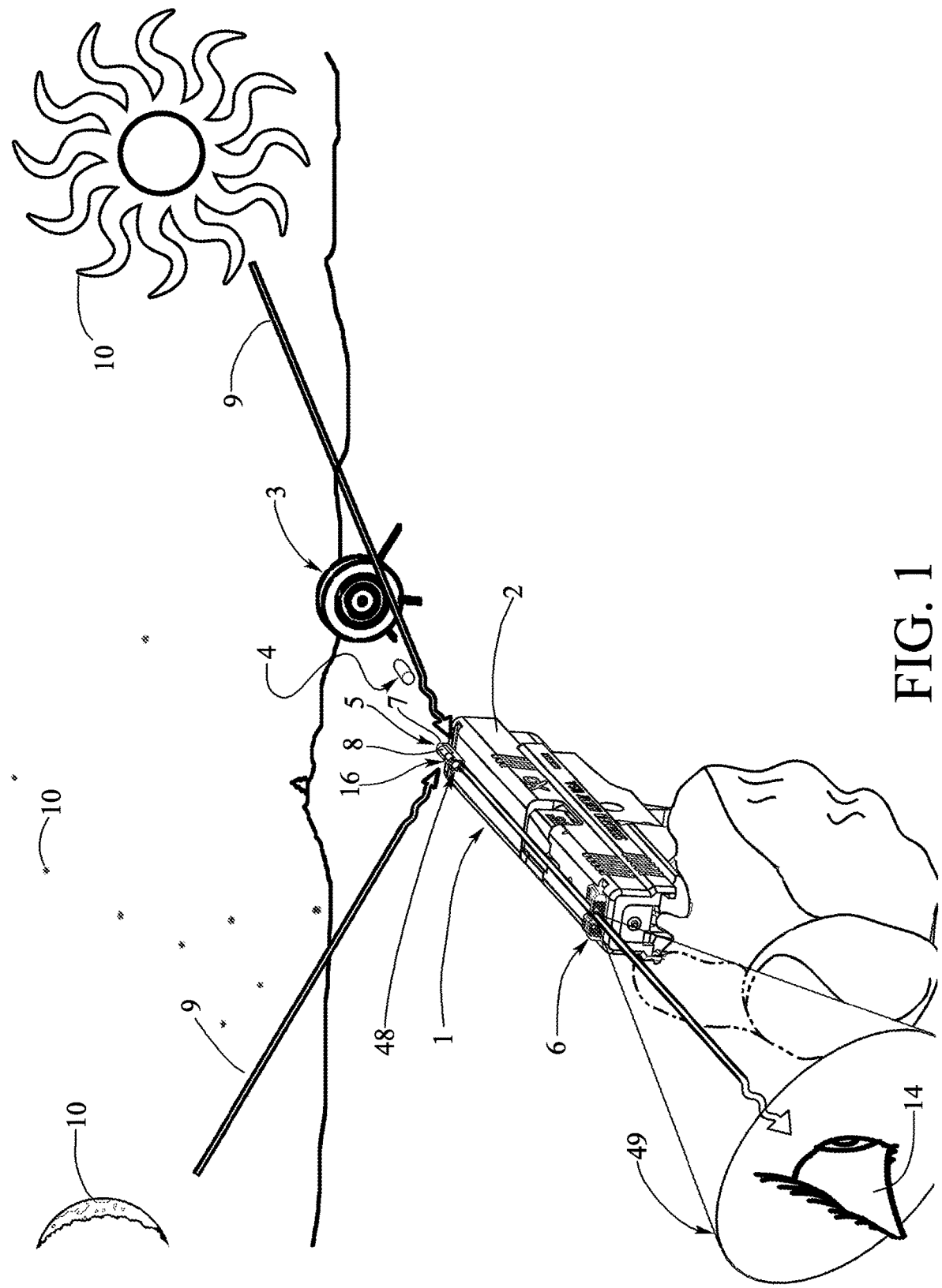
FIG. 1 is an illustration of a method of using an embodiment the inventive weapon sight.

Now referring primarily to FIG. 1, which illustrates a method of using a particular embodiment of the inventive weapon sight (1) which may be adapted for use with a numerous and wide variety of weapons (2) to aim the weapon to direct energy, project beams, launch projectiles (such as bullets, pellets, BBs), or the like whether each individually or in various combinations (individually or collectively "projectile(s)") (4) at a target (3). The weapons (2) to which the inventive weapon sight (1) can be adapted include, without limitation, hand guns, rifles, bows, shot guns, BB guns, pellet guns, laser weapons, energy weapons, or the like. The term "weapon" (2) is not intended to be limiting, but rather to broadly encompass devices which can be aimed for military, sporting, hobby or other applications. The target (3) may be any object at which the weapon (2) can be aimed to receive the projectile(s) (4), including, inanimate and animate objects.

Again referring primarily to FIG. 1, the inventive weapon sight (1) can include a front sight (5) and rear sight (6) one or both in fixed, adjustable, or adjustably fixed relation to the weapon (2) which allows positional alignment of the front sight (5) and the rear sight (6) to aim the weapon (2) to direct the projectile (4) toward the target (3). The front sight (5)(and as to certain embodiments the rear site (6)) can provide a light conductive member (7) separately or as part of a light emission assembly (29) (see for example the non-limiting embodiments of FIGS. 2, 8, 14, 20, and 41). The term "light conductive member (7)" as used herein includes constructional forms of one or more light conductive materials fabricated, formed, extruded, cast, molded, or by other process(es) provides a configuration having an external surface (8) which receives an amount of light (9) (also referred to herein as "ambient light") in the visible, ultraviolet, or infrared spectrum, separately or in combinations thereof, from a light source (10)(or combination of light sources) external to the light conductive member (7). The light conductive member (7) can transmit the amount of light (9)(also referred to as "the first amount of light") internally, in whole or in part, or as modified by any dopants included in the light conductive material of the light conductive member (7), to be emitted at the member ends (11)(12).

Various light conductive materials can be utilized to produce the light conductive member (7), including, without limitation, extruded, molded, cast, or fabricated plastic (such as polystyrene, polycarbonate, polyvinylchloride, TEFLON, nylon, polystyrene, polyurethane, acrylic, polyethylene terphthalate, polyethersulfone, polymethylmethacrylate, or the like, separately or in various combinations thereof). Particular embodiments of the light conductive member (7), as a consequence of the type of light conductive material or the constructional form of the light conductive member (7)(or as a consequence of both), can achieve total internal reflection, substantial internal reflection, or the desired level of internal reflection of the amount of light (9) incident on the external surface (8) of the light conductive member (7) to allow transmission of all, substantially all, or the desired amount of light (9) to the ends (11)(12) of the light conductive member (7). Light conductive materials suitable for use in embodiments of the invention can be obtained from ACI Plastics, St. Louis, Mo., USA.

As to other particular embodiments, the light conduct member (7) can be further surrounded by a plastic cladding material (such as polystyrene, polymethylmethacrylate, or fluoropolymer) which reflects the amount of light (9) within the light conductive material for transmission of the amount of light (9) to the ends (11)(12) of the light conductive member (7). The length, cross sectional configuration (such as circular, square, rectangular, oval, triangular, or the like), external surface area, thickness, width, or the amount of one or more dopants (13) within the light conductive material can be adjusted depending on the desired brightness, color, or amount of light (9) to be transmitted in the light conductive member (7) and to be emitted from the member ends (11)(12).

The light conductive materials of embodiments of the light conductive members (7) or light emission assembly (29) can further include or contain one or more dopants (13). The term dopant (13) as used herein means one or a plurality of similar or dissimilar trace impurity element(s) included separately or in various permutations and combinations in the light conductive material at concentrations such that the amount of light (9) in the spectrum received by the external surface (8) and transmitted within the light conducting member (7), whether in whole or in part, activates the one or more dopant(s)(13) which in turn fluoresce in a corresponding one or more wavelengths delivered to the member ends (11)(12) of the light conductive member (7) as a color perceivable to the eye (14).

The light conductive materials of embodiment of the light conductive members (17) or light emission assembly (29) can further include or contain one or more colorants (94). The colorant can be combined in various permutations and combinations with the light conductive material and one or more dopants (13) to achieve a desired color and fluorescence of the light conductive member (7). Combinations of colorant(s) (94) with dopant(s)(13) suitable for use with embodiments of the invention can be obtained from ColorChem International Corporation, 8601 Dunwoody Place, Atlanta, Ga.; Keystone Aniline Corporation, 2501 West Fulton Street, Chicago, Ill.; or Sun Chemical Corporation, 25 Waterview Boulevard, Persippany, N.J.

The term "light source (10) external to the light conductive member (7)" as used herein includes any source of light external to the light conductive member (7) which emits an amount of light in any one or more of the ultraviolet, infrared, or visible spectrum and without limitation to the forgoing general definition includes: celestial sources such as the sun, moon, stars; atmospheric sources such as auroae, lightning, cerenkov radiation; living organisms which emit light or bioluminesce; direct chemical sources in the form of chemoluminescence, fluorescence, phosphorescence; combustion sources such as gas, candles, kerosene, oil; electric powered sources such as incandescent lamps, electroluminescent lamps, gas discharge lamps, fluorescent lamps, lamps which emit ultraviolet or infrared light in whole or in part, or the like, and combinations thereof.

Figure 2:
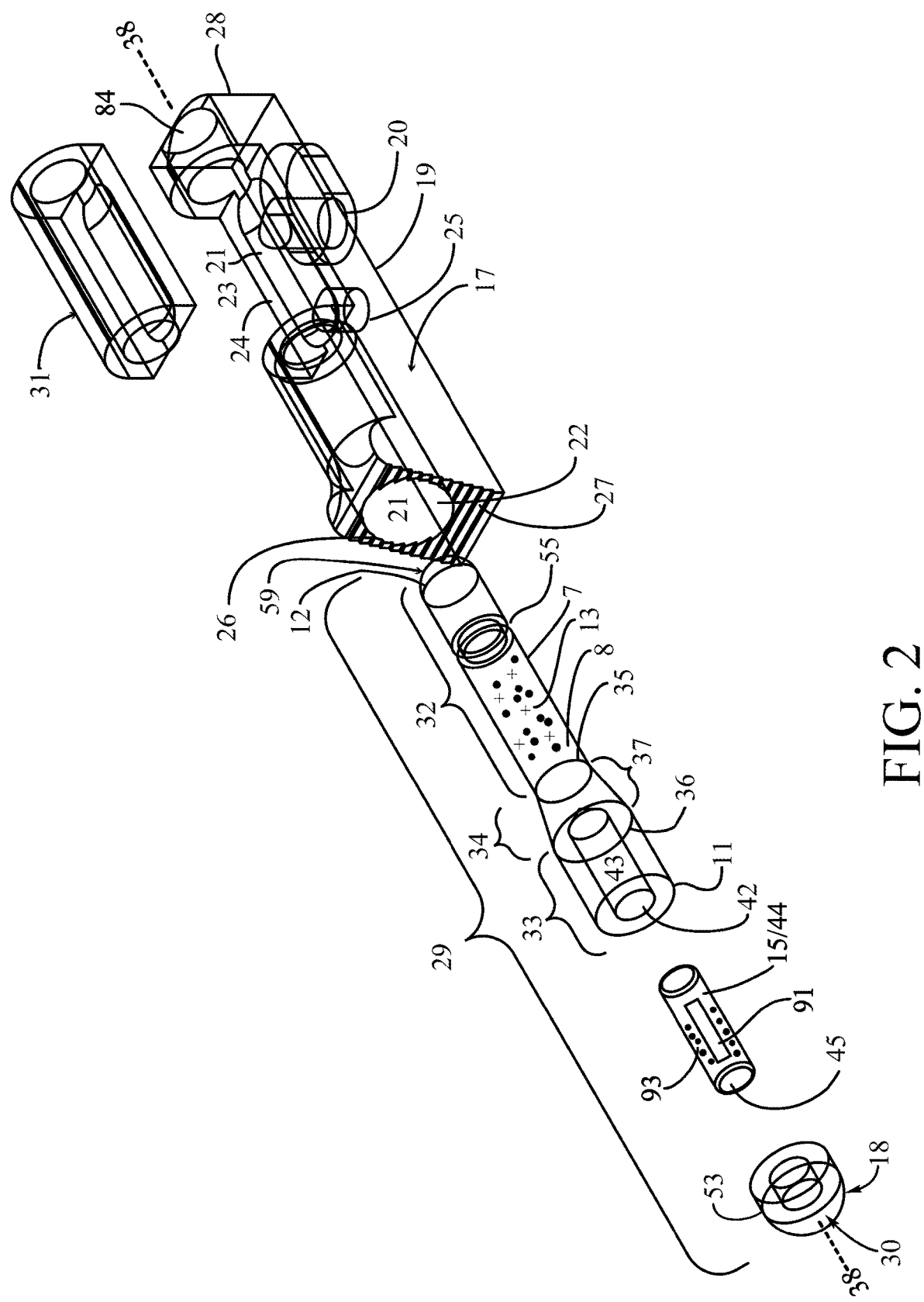
FIG. 2 is an exploded perspective view of a particular embodiment of the front sight of the inventive weapon sight.
Figure 8:
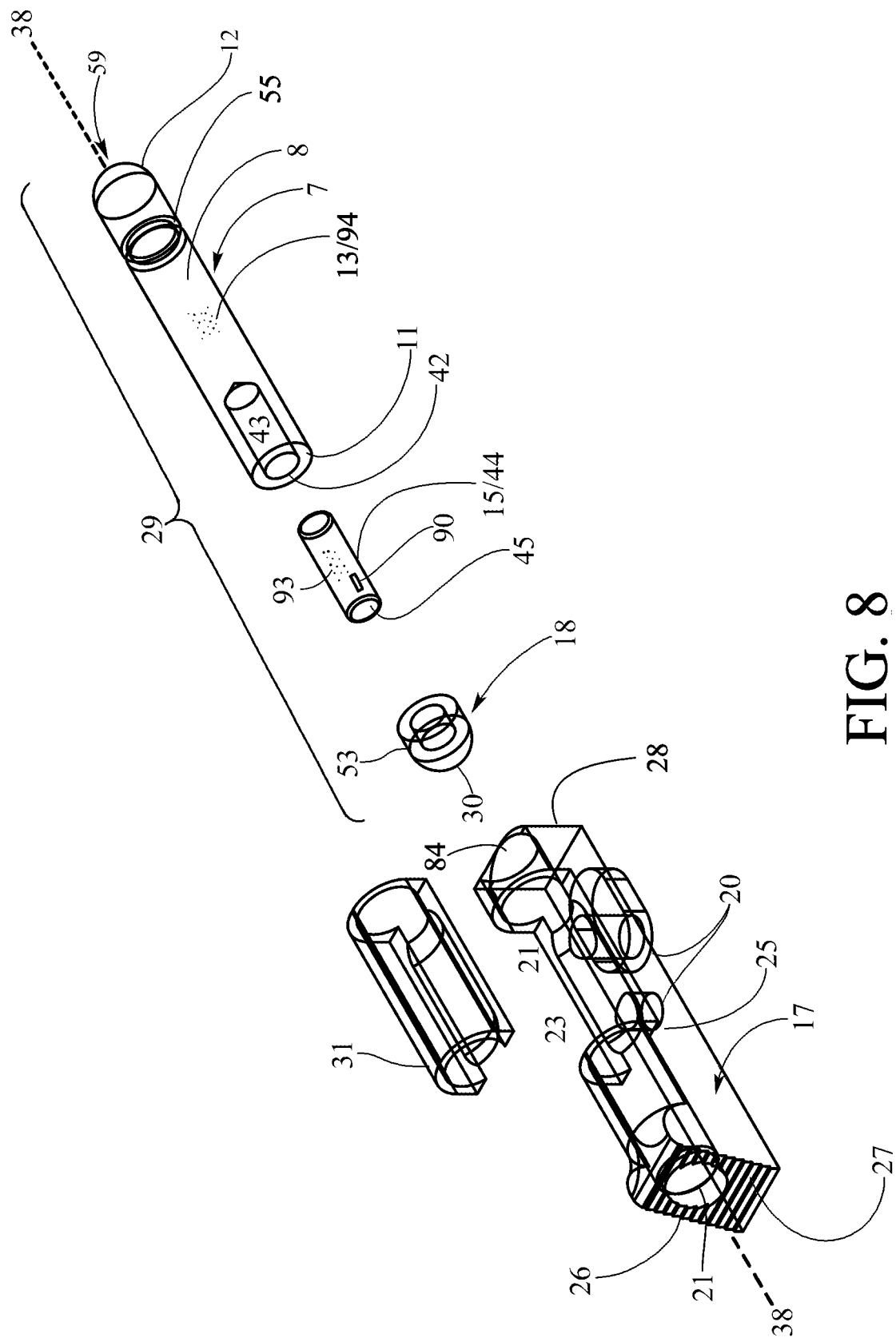
FIG. 8 is an exploded perspective view of another particular embodiment of the front sight of the inventive weapon sight.
Figure 14:
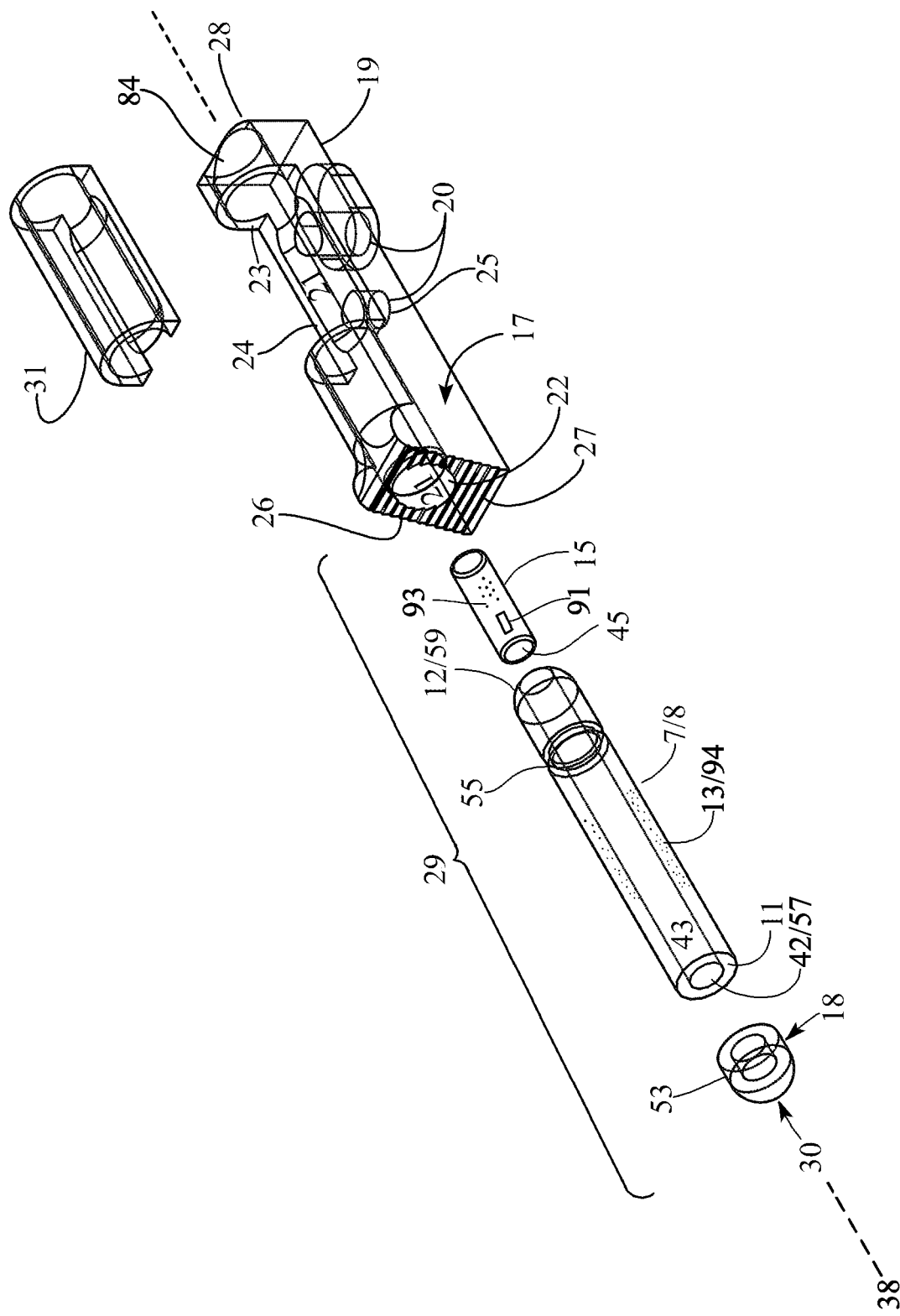
FIG. 14 is an exploded perspective view of another particular embodiment of the front sight of the inventive weapon sight.
Figure 20:
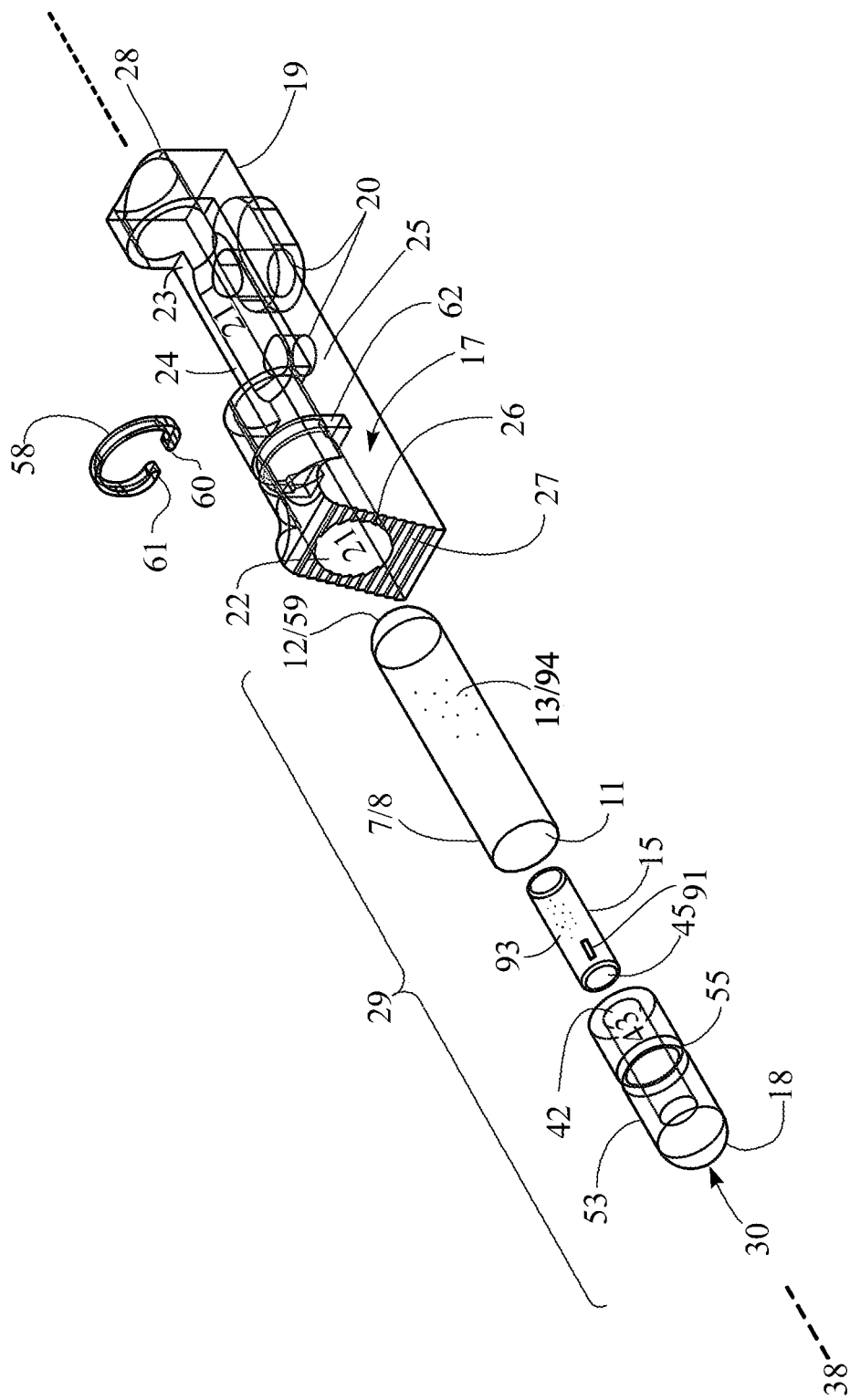
FIG. 20 is an exploded perspective view of another particular embodiment of the front sight of the inventive weapon sight.
Figure 23:
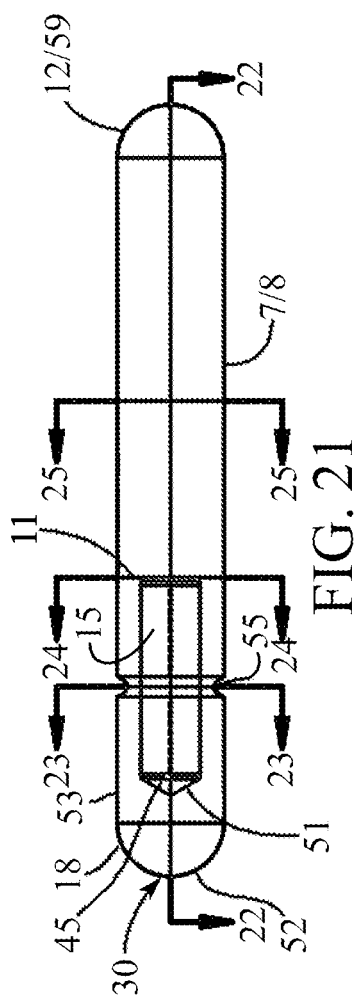
FIG. 23 is a transverse cross section 23-23 of the particular light emission assembly shown in FIG. 21.
Figure 24:
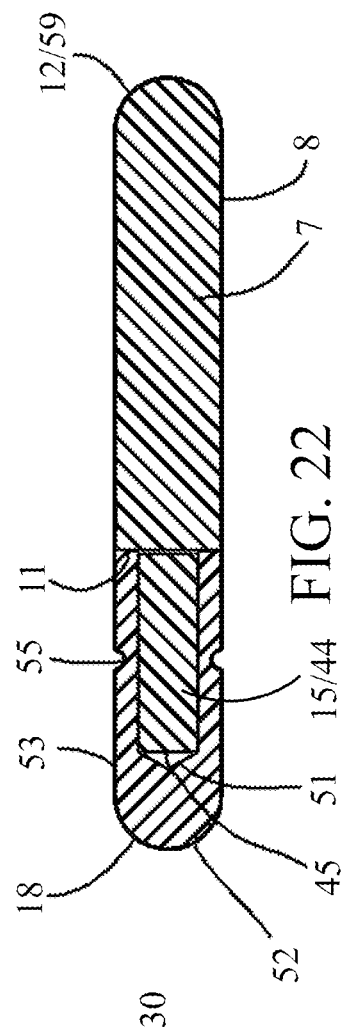
FIG. 24 is a transverse cross section 24-24 of the particular light emission assembly shown in FIG. 21.
Figure 25:
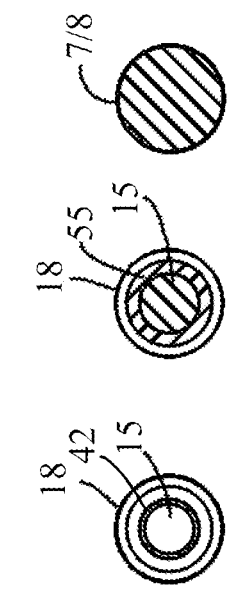
FIG. 25 is a transverse cross section 25-25 of the particular light emission assembly shown in FIG. 21.

Again referring primarily to FIGS. 1 and 2, embodiments of the front sight (5) or light emission assembly (29), can further include a light emitting element (15) having a location in whole inside of the light conductive member (7) or inside of the light emission assembly (29). As to particular embodiments, the light emitting element (15) can be disposed in part or in whole inside of the light conductive member (7). As to other embodiments, the light emitting element (15) can be disposed in whole or in part in a lens (18) coupled to the light conductive member (7) As to other embodiments, the light emitting element (15) can be disposed in part in the lens (18) and in part in the light conductive member (7), illustrative embodiments further described below. The light emitting element (15) can provide an amount of emitted light (16)(also referred to as "a second amount of light") directed toward the ends (11)(12) of the light conductive member (7) or the light emission assembly (29)(see also FIG. 54).

The light emitting element (15) can take a variety of forms including, without limitation: light emitting diodes, luminescent paint, chemoluminescent elements, electroluminescent conductors, or radioluminescent elements (for example, a radionuclide which emits beta radiation, such as a tritium (91) gas-filled capsules having capsule inner surfaces (92) coated with a dopant (93) or phosphor activated by beta radiation emitted by the tritium (91))(such as those available from MB Microtec in CH-3172 lower panels in different colors), or the like.

The amount of emitted light (16) delivered to the eye (14) from the light emitting element (15) in accordance with embodiments of the invention can be sufficient even in the absence or reduction in the amount of light (9) received and transmitted by the light conductive member (7) (or light emission assembly (29)) to allow the weapon (2) to be aimed.

Now referring primarily to FIGS. 2-7 and 26-31 which illustrate a first non-limiting embodiment of the front sight (5) of the weapon sight (1) having a base (17) which receives a light emission assembly (29) which includes in combination one or more of the light conductive member(s) (7), the light emitting element (15), and a lens (18). The base (17) as to each embodiment of the invention can have a configuration capable of retaining the light emission assembly (29) in fixed positional relation or adjustable fixed relation to the weapon (2) for aiming. A non-limiting embodiment of the base (17) as shown in the Figures, can have a substantially elongate shape with a portion of the exterior surface (25) configured to mount the front sight (5) in fixed positional relation or adjustable fixed relation to the weapon (2). As shown in the non-limiting example of FIG. 2 (see also as examples FIGS. 28 and 36), the base (17) can have bottom surface (19) configured to mateably engage a correspondingly configured portion of the weapon (2). As to particular embodiments, the bottom surface (19) can provide one or more mounting apertures (20). The mounting apertures (20) can extend through the bottom surface (19) of the base (17) and can be configured to receive mechanical fasteners for attachment of the base (17) to the weapon (2) by mated spiral thread, or the like. While the base (17) shown in FIG. 2 has a bottom surface (19) configured to receive threaded fasteners; the invention is not so limited, and the external surface of the base (17) can be in the alternative configured for attachment by conventional dove tail and pinned mounts, magnets, catches, snap-on elements, or the like. The base (17) further defines an internal hollow space (21) configured to receive within the light conductive member (7) or the light emission assembly (29). As shown in the various Figures, the internal hollow space (21) can define an internal surface (22) of generally cylindrical configuration to receive a light emission assembly (29) having a light conductive member (7) and lens (18) having an external surface (8) of generally cylindrical configuration; however, the invention is not so limited and the internal hollow space (21) can have an internal surface (22) of generally oval, triangular, rectangular, or any other configuration sufficient in dimension to receive a light emission assembly (29) whether or not correspondingly configured to match the external surface (8) of the light emission assembly (29). The internal surface (22) can further define an opening (26) in at least one of the base ends (27)(28) through which the viewing end (30) of the light conductive member (7) or the light emission assembly (29) can be viewed by the eye (14). The base (17) can further define a light receiving aperture (23). The perimeter (24) of the light receiving aperture (23) can be configured to allow a portion of the external surface (8) of the light conductive member (7) when located within the internal hollow space (21) of the base (17) to receive an amount of light (9) from a light source (10) (for example as shown in FIG. 1). The perimeter (24) of the light receiving aperture (23) can be configured to provide a greater or lesser amount of light (9) to be received by the external surface (8) of the light conductive member (7) for transmission to the viewing end (30). The base (17) can further include a transparent cover (31) which can be fabricated to fit or molded within the light receiving aperture (23) to substantially enclose the exposed portion of external surface (8) of the light conductive member (7) or light emission assembly (29).

Again referring primarily to FIGS. 2-7, the particular embodiment of the light conductive member (7) shown provides a first portion (32) distal from the viewing end (30) having lesser cross sectional area (see for example FIG. 7) than a second portion (33) proximate the viewing end (30) having a greater cross sectional area (see for example FIG. 3). The first portion (32) and the second portion (33) can be coupled through a transition portion (34) having a first end (35) corresponding to the lesser cross sectional area of the first portion (32) and a second end (36) corresponding to the greater cross sectional area of the second portion (33). The length (37) of the transitional portion (34) can vary to establish the external surface (8) of the transition portion (34) at angles (39) in relation to the central longitudinal axis (38) that establish sufficient internal reflection (40) of the amount of light (9) received by the external surface (8) of the first portion (32) for transmission to the viewing end (30) (see for example FIG. 54).

Now referring primarily to FIGS. 3 and 54, the transitional angle (39) of the transition portion (34) can be adjusted to provide an increased internal reflection (40) in relation to one, more than one, or a range of angles of incidence (41) of the amount of light (9) on the external surface (8) of the first portion (32) of the light conductive member (7). While all angles of incidence (41) can to a certain degree be made operable, greatest light transmission to the viewing end (30) can be achieved by embodiments of the light conductive member (7) which achieve near total or total internal reflection (40)("TIR") for a range of angles of incidence (41) or at specific angles of incidence (41) selected from within the range of about 0° degrees to the surface perpendicular (64) and about 70° from surface perpendicular (64) toward the external surface (8) (see FIG. 54), and without limitation to the forgoing for illustrative purposes, can be an angle of incidence (41) of about 67° from surface perpendicular (64) toward the external surface (8) of the first portion (32) of the light conductive member (7).

Again referring primarily to FIG. 54, the light conductive member (7) can be configured to operate in accordance with Snell's law and the Fresnel equations as set out below. Snell's Law:

$$\frac{\sin\theta 1}{\sin\theta 2} = \frac{\eta 2}{\eta 1}$$

Re-arranging and solving for $\theta 2$:

$$\theta 2 = \arcsin\left(\frac{\eta 1}{\eta 2}\sin\theta 1\right)$$

Snell's law allows determination of the angle of refraction as light changes conducting mediums (for example air to water, water to glass, air to the material of the light conductive member (7), or the like). When the value for $$\frac{\eta 1}{\eta 2}\sin\theta 1$$

exceeds one the equation has no solution since the sine function is only defined between zero and one. The physical behavior for this condition is total internal reflection ("TIR") (40). The angle of incidence (41) at which this occurs is referred to as $\theta_{critical}$ or $\theta_C$. When this occurs there will be no refraction of the amount of light (9) received by the external surface (8) of the light conductive member (7) and all or substantially all of amount of light (9) can be reflected (40) within the light conductive member (7). TIR (40) is desirable because this condition reduces the amount of light lost from the light conductive member (7) due to refraction. $\theta_C$ is a function of the indexes of refraction of the materials, $\eta 1$, $\eta 2$ and the angle of incidence (41) of the amount of light (9) upon the external surface (8) of the light conductive member (7). TIR can be achieved in certain embodiments of the light conductive member (7) and light emission assemblies (29) having configurations which direct rays of transmitted light (65)(as shown for example in FIG. 54) such that they have an angle of internal reflection (40) inside the light conductive member (7)(or light emission assembly (29)) of greater than $\theta_C$, thereby increasing the amount of light (9) transmitted through the light conductive member (7), or through the first portion (32) and second portion (33) of the light conductive member (7) (as to those embodiments configured in that manner), and the lens (18).

Concomitantly, as embodiments approach TIR (40), the amount of light (9) directed towards the eye (14) by the configuration of the lens (18) can be have angle of incidence less than $\theta_C$ to increase the amount of light (9) leaving embodiments of the light emission assembly (29). As further described below the configuration of the lens (18) can further direct that amount of light (9) leaving the light emission assembly (29) at an angle of egress (67) which can match or be similar to the angle of the rays of emitted light (66) leaving the light emission assembly (29) generated by the light emitting element (15), as further described below. The angle of egress (67) of the rays of transmitted light (65) or rays of emitted light (66) from the lens (18) can be a function of the internal angle of reflection (40), refraction and conduction across the internal surface (68) of the light conductive member (7) including the first portion (32) and second portion (33) if so configured, the emitted light (16) from the light emitting element (15), the subsequent reflection inside the lens (18), the configuration of the transmitted light reflecting surface (52), and the configuration of the of emitted light refraction surface (51) of the lens (18).

The front sight (5) can be configured in accordance with the Fresnel equations to achieve greater light gathering abilities of the light emission assembly (25). The Fresnel equations allow determination of the magnitude of the reflected and refracted light rays upon the external surface (8) and internal surface (68) of embodiments of the light conductive member (7) or the light emission assembly (29).

The Fresnel Equations:

$$R_s = \left(\frac{\eta_1 \cos\theta_1 - \eta_2 \cos\theta_2}{\eta_1 \cos\theta_1 + \eta_2 \cos\theta_2}\right)$$

for S-polarized light.

$$R_p = \left(\frac{\eta_1 \cos\theta_2 - \eta_2 \cos\theta_1}{\eta_1 \cos\theta_2 + \eta_2 \cos\theta_1}\right)$$

for P-polarized light $$R_{total} = \left(\frac{R_S + R_P}{2}\right)$$

for unpolarized light.

One advantage of the application of the Fresnel Equations can be determination of the range of angles of incidence (41)(or specific or selected angles of incidence (41) within the range) which can enter the light conductive member (7) or light emission assembly (29) rather than reflect back into the environment.

Now referring primarily to FIG. 55, which provides an illustrative example of data for common values of $\eta 1$,$\eta 2$. At angles of incidence (41) greater than about 70° in relation to the surface perpendicular (64), the amount of light (9) being reflected off the external surface (8) of embodiments of the light conductive member (7) can increase rapidly, approaching 100% reflection at about 90° angle of incidence (41) in relation to the surface perpendicular (64).

One advantage of providing the transitional portion (34) can be to achieve a greater cross sectional diameter of the second portion (33) of the light conductive member (7) to correspondingly provide an increased area of the illumination field (49) of the aiming indicia (48) at the viewing end (30) of the light emission assembly (29).

Again referring to FIGS. 2-7, another advantage of providing the transitional portion (34) can be to provide the second portion (33) of the light conductive member (7) with sufficient cross sectional area to define within a chamber (42) having sufficient volume (43) to enclose in part or in whole the light emitting element (15). By locating the light emitting element (15) inside the chamber (42) of the light conductive member (7), embodiments of the light emission assembly (29) can be configured with a reduced length, correspondingly reducing attenuation or the gradual loss of light intensity of the amount of light (9) transmitted through the light emission assembly (29). Accordingly, the shorter the light emission assembly (29) the less attenuation that can occur and the brighter the illumination field (49). Additionally, the shorter the light emission assembly (29) the longer the sight radius which can provide greater precision in the alignment of the front sight (5) with the rear sight (6).

The chamber (42) and the light emitting element (15) can be configured to direct emitted light (16) toward the viewing end (30) of the light conductive member (7). As to certain embodiments in which the light emitting element (15) comprises a tritium capsule (44) the emitted light (16) can be transmitted from the tritium capsule end (45) (the other surfaces can be but are not necessarily shielded to prevent light emission in other directions). As to certain embodiments, the emitted light (16) of the light emitting element (15) can in part or in whole be directed into the light conductive member (7). One or more dopants (13) contained in the light conductive member (7) can fluoresce in response to the emitted light (16) directed into the light conductive member (7) by the light emitting element (15). The fluorescent light emitted by the one or more dopants (13) can be transmitted by the light conductive member (7) to the viewing end (30) of the light conductive member (7) or the light emission assembly (29).

As to certain embodiments, the tritium capsule (44) can be received within the chamber (42) with a light emitting end (45) directed toward the viewing end (30) of the light conductive member (7). As to those embodiments in which the second portion (33) of the light conductive member (7) has a circular cross section as shown in the Figures, the chamber (42) can also have a circular cross section with the central longitudinal axis (38) of the light conducting member (7) passing generally through the center of the chamber (42) or the chamber (42) can be coaxially disposed inside of a light emission assembly (29) having the light conductive member (7) and the lens (18) also coupled in coaxial relation.

As one non-limiting example of operable dimensional relations of the embodiment the light conductive member (7) shown in FIGS. 2-7, the first portion (32) can have diameter of about 0.085 inches and the first portion (33) can have a diameter of about 0.125 inches and the transitional portion (34) can have a length of about 0.032 with an angle (39) of about 23° in relation to the longitudinal axis of the light conductive member (7). The overall length can be about 0.660 inches. The chamber (42) can have diameter of about 0.060 inches.

Again referring primarily to FIGS. 2-7 and 41, the chamber (42) can further include a first emitted light refracting surface (51) disposed proximate the viewing end (30) of the light conducting member (7) or the light emission assembly (29) and the chamber (42) can further include a second emitted light refracting surface (63) disposed distal from the viewing end (30). The first emitted light refracting surface (51) can have a refraction surface angle (70)(see FIG. 54) adapted to divergently refract the amount of emitted light (16) of the light emitting element (15) to substantially fill the area bounded by the illumination field (49). Particular embodiments of the chamber (42) can have a constructional form of a cylindrical bore (71) which terminates in emitted light refraction surfaces (51)(63) each substantially in the form of a cone (72). As to the particular embodiment having the dimensional relations above described the refraction surface angle (70) can be about 35°; however, the invention is not so limited.

Now referring primarily to FIG. 6A, from the viewing end (30), prior to attachment of the lens (18), the amount of light (9) transmitted toward the viewing end (30) by the light conducting member (7) can appear as an annular area of light (46) while the emitted light (16) of the light emitting source (15)(such as a tritium capsule (44)) can appear as a circular area of light (47), filling the center defined by the annular area of light (46). In high ambient light, only the annular area of light (46) may be apparent to the eye (14) while in low ambient light only the circular area of light (47) may be apparent to the eye (14). These differences in the presentation of the light (9) transmitted by the light conductive member (7) and the emitted light (16) of the light emitting element (15) to the eye (14) under different ambient light conditions affords an aiming indicia (48) having an illumination field (49) which can lack consistency with respect to the pattern of illumination, the area of illumination, and uniformity of illumination, or brightness of the illuminated field (49).

Again referring primarily to FIGS. 1, 3 and 54, to reduce or avoid these inconsistencies or to make consistent the aiming indicia (48) observable by the eye (14) as to the pattern of the illumination field (49), area of the illuminated field (49), and uniformity of illumination or brightness of the illumination field (49), under a given amount of light (9) and emitted light (16), the lens (18) can be configured to spread the amount of light (9) transmitted through the light conductive member (7) and spread the emitted light (16) from the light emitting element (15) to substantially fill the illumination field (49) to provide the aiming indicia (48) for the weapon sight (1). By spreading the amount of light (9) transmitted through the light conductive member (7) to substantially fill the illumination field (49) and by spreading the emitted light (16) emitted from the light emitting element (15) to substantially fill the illumination field (49), the combined light (9)(16) spread over the illumination field (49) can make the aiming indicia (48) substantially consistent as to brightness over the area bounded by the illumination field (49) to avoid or substantially reduce presentation of the transmitted amount of light (9) and emitted light (16) in the illumination field (49) as a separate circular area of light (47) or a separate annular area of light (46).

As one non limiting example, the lens (18) can be coupled to the light conductive member (7) after the light emitting element (15) has been received within the chamber (42). The lens (18) can define the boundary of the illumination field (49) proximate the viewing end (30) (see for example FIGS. 6, 6A, and 41) which may be of lesser or greater cross sectional area (50) than that of the light conducting member (7). The angle of egress (67) of light from the lens can be approximately 20 degrees resulting in a 40 degree illuminated field (49). This configuration allows rapid acquisition of the aiming indicia (48) by the eye (14).

Now referring primarily to FIGS. 2-4 and 54, as one non-limiting example, the lens (18) can have a form which provides a part of the chamber (42) including the first emitted light refracting surface (51) which refracts a substantial portion of the emitted light (16) divergently to substantially fill the area bounded by the illumination field (49). Similarly, the surface of the lens proximate the viewing end (30) can be configured to provide a transmitted light reflecting surface (52) which reflects transmitted light convergently to fill the area bounded by the illumination field (49). The first emitted light refracting surface (51) and the transmitted light reflecting surface (52) can correspondingly act upon the emitted light (16) and the amount of light (9) transmitted by the light conductive member (7) to provide an illuminated field (49) having a substantially fixed area and pattern which affords substantially uniform illumination within the area bounded by the illumination field (49) for a particular set of conditions regardless of the amount of light (9) transmitted by the light conductive member (7) or the amount of emitted light (16) generated by the light emitting member (15).

As to the particular embodiment shown in FIGS. 2-4 and 41, the lens (18) can have a generally cylindrical lens body (53) with a circular cross section (see for example FIG. 5) having a diameter substantially similar to the circular cross sectional diameter of the second portion (33) of the light conductive member (7) (see for example FIG. 6). The lens body (53) can be coupled to the viewing end (30) of the light conductive member (7) to produce a light emission assembly (29) having a generally continuous external surface (8). The lens body (53) can terminate at the viewing end (30) in the transmitted light reflecting surface (52) having a generally hemispherical or partial spherical configuration with a radius sufficiently curved to direct transmitted light (9) received from the end of the light conductive member (7) at a viewing angle (67) in a range of about 15° to about 25°. As to particular preferred embodiments, the viewing angle (67) can be in the range of about 18° and about 20°. The portion of the lens (18) can provide a part of the chamber (42) in the form of a cylindrical bore with the first emitted light refracting surface (52) configured as a conical refracting surface with the apex directed toward the viewing end (30). The angle of the conical refracting surface can be adjusted to refract emitted light (16) from the end of the light emitting element (15) divergently toward the perimeter (54) of the illumination field (49) defined by the lens (18) to provide a viewing angle (73) in a range of about 15° to about 25°. As to particular preferred embodiments, the viewing angle (73) can be in the range of about 18° and about 20°.

Now referring primarily to FIG. 54, as a non-limiting example, the form of the lens (18) can provide a viewing angle (67) of the amount of light (9) transmitted by the light conductive member (7) convergently reflected by the lens (18) and the viewing angle (73) of the amount of emitted light (16) divergently refracted by the first emitted light refracting surface (51) which are substantially similar within the range of about 18° to about 20°. As a non-limiting example, if the viewing angle (67) of the amount of light (9) convergently reflected by the lens (18) is about 20 degrees then the viewing angle (73) of the amount of emitted light (16) divergently reflected by the first light refraction surface (51) can also be about 20 degrees, or the viewing angles (67)(73) can be substantially similar.

However the invention is not so limited and each of the viewing angles (67)(73) can be selected within a range consisting of: about 15 degrees to about 17 degrees, about 16 degrees to about 18 degrees, about 17 degrees to about 19 degrees, about 18 degrees to about 20 degrees, about 19 degrees to about 21 degrees, about 20 degrees to about 22 degrees, about 21 degrees to about 23 degrees, about 22 degrees to about 24 degrees, and about 23 degrees to about 25 degrees.

Now referring primarily to FIGS. 2 and 3, the first portion (32) of the of the light conductive member (7) can further include an annular groove (55) which can receive a corresponding circular fastener (58) which attaches to the base (17) or receives a corresponding annular member (56) of the cover (31) or otherwise receives a detent to longitudinally axially secure the light emission assembly (29) within the hollow inside space (21) of the base (17).

Now referring primarily to FIG. 4, certain embodiments of the chamber (42) can longitudinally extend a distance within the lens (18); however, the invention is not so limited and the chamber (42) can be located entirely within the light conductive member (7) (see for example FIG. 16), or located entirely within the lens (18) (see for example FIG. 22) or located in part in the light conductive member (7) and in part in the lens (18)(see for example FIGS. 4 and 10).

Now referring primarily to FIGS. 8-13, 26-30 and 32, another non-limiting embodiment of the light emission assembly (29) is shown in which the cross sectional area of the light conductive member (7) and the lens body (53) remain substantially similar between the viewing end (30) and the non-viewing end (59). All other elements can have the structure and function above described.

Now referring primarily to FIGS. 14-19, 26-30 and 33, another non-limiting embodiment of the light emission assembly (29) is shown in which the cross sectional area of the light conductive member (7) and the lens body (53) remain substantially similar between the viewing end (30) and the non-viewing end (59) as above described and is further characterized by a configuration of the chamber (42) which establishes a bore (57) open at both ends (11)(12) of the light conductive member (7). The bore (57) allows the light emitting element (15) to be fixedly or adjustably located inside of the light conductive member (7) at any point along the longitudinal axis (38) between the first end (11) and the second end (12). As shown in FIG. 16, the light emitting member (15) can be located proximate the second end (12) inside of the chamber (42) of the light conductive member (7); however, the invention is not so limited, and the light emitting member (15) as to certain embodiments can slidly engage the chamber (42) to positionally achieve greatest brightness of the illuminated field (49) under particular ambient conditions.

Now referring primarily to FIGS. 20-25 and 34-40, another non-limiting embodiment of the light emission assembly (29) is shown in which the light conductive member (7) has a substantially consistent diameter between the first end (11) and the second end (12) and entirely lacks the chamber (42). The lens body (53) has sufficient length and external dimensions to define the entirety of the chamber (42) within allowing the light emitting element (15) to be surrounded by the lens (18). The lens (18) having received the light emitting member (15) within the chamber (42) can be coupled to the first end (11) for the light conductive member (7) to enclose the light emitting member (15) within the light emission assembly (29). The lens (18) can further include the annular groove (55) which receives a circular fastener (58) having an opening in the perimeter which defines clip ends (60)(61) disposed in opposed relation. The base (17) correspondingly provides a slot (62) which can be aligned with the annular groove (55). The circular fastener (58) can be inserted through the slot (62) and the clip ends (60)(61) of the circular fastener (58) spread by forcible urging against the surfaces of the annular groove (55) to position the circular fastener (58) within the annular groove (55). Engagement of the corresponding surfaces of the slot (62) and the circular fastener (58) substantially prohibit longitudinal axial travel of the light emission assembly (29) within the base (17). The embodiment of FIG. 20 does not provide a cover (31) and the base (17) has a configuration which correspondingly surrounds the lens body (53) which contains the light emitting element (15) within the chamber (42).

Now referring primarily to FIGS. 41-46 and 47-53, another non-limiting embodiment of the light emission assembly (29) is shown in which the light conductive member (7) has a first portion (32) and a second portion (33). The first portion (32) in latitudinal cross section can define a substantially circular area (see FIG. 46) of substantially consistent diameter between the first end (11) and the second end (12). The second portion (33) in latitudinal cross section can define a substantially circular area (see FIG. 44) of substantially consistent diameter between the viewing end (30) and a second end (74). The viewing end (30) can terminate in a lens (18) in a form which provides the transmitted light reflecting surface (52) with a radius sufficiently curved to convergently direct the amount of light (9) received from the light conductive member (7) to fill the area of the illumination field (49) and provide a viewing angle (67) in a range of about 15° to about 25°, as above described. As shown in FIGS. 42 and 43, a chamber (42) in the form of a cylindrical bore (71) can be disposed in part within the first portion (32) and in part in the second portion (33) of the light emission assembly (29). The first portion (32) and the second portion (33) of the light conductive member (7) and the chamber (42) can be disposed in coaxial relation to the longitudinal axis (38) of the light emission assembly (29). Embodiments of the light emitting element (15) in the form of an elongate tritium capsule (44) can be coaxially disposed inside of the chamber (42). The chamber (42) can terminate proximate the viewing end (30) in a cone (72) first emitted light refraction surface (51) having a light refraction angle (73) which divergently directs emitted light (16) from the light emitting element (15) to fill the area bounded by the illumination field (49). The first portion (32) and the second portion (33) of the light emission assembly (29) can provide a coupler element (75) in the form of matable parts (76)(77). As shown in FIG. 41, as a non-limiting example, the matable parts (76)(77) of the coupler (75) can take the form of a cylindrical member (78) coaxially disposed at the second end (11) of the first portion (32) of the light conductive member (7). The cylindrical member (78) can slidably insert by forcible urging into a corresponding cylindrical sleeve (79) coaxially disposed within the second end (74) of the second portion (33) of the light conductive member (7). An annular member (80) can be coupled to the cylindrical member (78) and a corresponding annular recess (81) can disposed in the cylindrical sleeve (79) to receive the annular member (80) upon slidable insertion of the cylindrical member (78) within the cylindrical sleeve (79). As to particular embodiments, receipt of the annular member (78) in the annular recess (81) can provide fixed or removably fixed engagement of the first portion (32) of the light conductive member (7) to the second portion (33) of the light conductive member (7). Now referring primarily to FIGS. 42 and 43, the second portion (33) of the light conductive member (7) proximate the viewing end (30) can have a lesser diameter terminal end (82) to provide an annular shoulder (83).

Now referring primarily to FIG. 41, a base (17), substantially as above described, can have a configuration capable of retaining the light emission assembly (29) in fixed positional relation or adjustable fixed relation to the weapon (2) for aiming. The base (17) further defines an internal hollow space (21), substantially as above described, which receives within the light the light emission assembly (29) as shown in FIGS. 42-46. The internal surface (22) of the base (17) can further define a first end opening (26) in a first base end (27) through which the viewing end (30) of the light emission assembly (29) can be viewed by the eye (14) and a second end opening (84) in a second base end (28). The second end opening (84) can be sufficiently large to allow the light emission assembly (29) to be received inside the internal hollow space (21). The first end opening (26) can be sufficiently large to allow the lesser diameter terminal end (82) of the second portion (33) of the light conductive member (7) to pass through allowing the annular shoulder (83) to engage the internal surface (21) of the base (17) proximate the opening (26). A second end opening (84) can be configured to receive a plug (85) to prevent egress of the light emission assembly (29) from the internal hollow space (21). The matable surfaces (86)(87) of the second end opening (84) and the plug (85) may removably engage by way of mated spiral threads or other releasable mated elements Compressible elements (88)(89) can be disposed between the annular shoulder (83) of the light emission assembly (29) and the corresponding part of the internal surface (22) of the base (17) and between the second member end (12) of the light conductive member (7) and the inner surface (90) of the plug (85).

The base (17) can further define a light receiving aperture (23), as above described. The perimeter (24) of the light receiving aperture (23) can be configured to allow a portion of the external surface (8) of the light conductive member (7) when located within the internal hollow space (21) of the base (17) to receive an amount of light (9) from a light source (10) (for example as shown in FIG. 1). The perimeter (24) of the light receiving aperture (23) can be configured to provide a greater or lesser amount of light (9) to be received by the external surface (8) of the light conductive member (7) for transmission to the viewing end (30). The base (17) can further include a transparent cover (31) which can be fabricated to fit or molded within the light receiving aperture (23) to substantially enclose the exposed portion of external surface (8) of the light conductive member (7) or light emission assembly (29).

Now referring primarily to FIGS. 56 and 57A through 57D which shows another embodiment of the inventive weapon sight (1) having a light emission assembly (29) which includes a light conductive member (7) having a length disposed between a member first end (11) and a member second end (12) and an external surface (8) configured to receive a first amount of light (9) from a light source (10) external to said light conductive member (7), as above described. The light conductive member (7) can further contain one or more dopants (13), as above described, which fluoresce in response to said first amount of light (9) conducted within said light conductive member (7). A chamber (42) can be disposed inside of the light conductive member (7). The chamber (42) can have a location entirely inside of the light conductive member (7). The chamber (42) has a closed end (95) located between said first member end (11) and the second member end (12) of the light conductive member (7) and the chamber (42) has an open end (96) communicating with the member second end (12) of the light conductive member (7) to allow access to the chamber (42). As to particular embodiments, the open end (96) of the chamber (42) can be closed by engagement of an end seal (97). The end seal (97) can take any form that closes the open end (96) of the light conductive member (7) to enclose a volume (43) of the chamber (7). As to particular embodiments, the end seal (97) can be in the structural form a plug (98) which inserts into the open end (96) of the chamber (42). The plug (98) can be retained or removably retained in the open end (96) by frictional forces, adhesive, spin welding, or the like. As to other embodiments the end seal (97) can be in the form of an amount of polymeric material (99), such as silicone rubber, acrylic polymer, or the like, which in the uncured condition can be a liquid or gel which can be disposed in the open end (96) of the chamber (42) and upon curing serves to close the open end (96) of the chamber (42).

Again referring to FIGS. 56 and 57A through 57D, the light emission assembly (29) can further include a light emitting element (15), as above described, which can be disposed inside of the chamber (42). As to particular embodiments, an amount of adherent (100) can be applied to the external surface light emitting element (15) which, upon insertion of the light emitting element (15) into the chamber (42), retains the light emitting element (15) inside of the chamber (42). As to other particular embodiments, the end seal (97) can then be engaged with the open end (96) of the chamber (42) to close the open end (96) and thereby retain the light emitting element (15) within the chamber (42). The light conductive member (7) can receive a second amount of light (16) emitted from the light emitting element (15). The light conductive member (7) conducts the first and second amount of light (9)(16) to the first member end (11) of the light conductive member (7) to provide a viewable aiming indicia (48). The light conducting member (7) can further contain one or more dopants (13) which fluoresce in response to the first or second amount of light (9)(16) emitted by said light emitting element. The amount of fluoresced light (100) can be conducted to the first member end (11).

Again referring to FIGS. 56 and 57A through 57D, the light emission assembly (29) can further include a lens (18) connected to, or directly connected to the first member end (11) of the light conductive member (7). As to particular embodiments, the lens (18) can be configured to provide a light refracting surface (52) which refracts the first amount of light (9) conducted within the light conductive member (7) toward a boundary (101) of an illuminated field (49) at the first member end (11) of the light conductive member (7) to provide the viewable aiming indicia (48). Additionally, the closed end (95) of the chamber (42) can further include an emitted light refraction surface (51) configured to refract the second amount of light (16) emitted from the light emitting element (15) toward or to the boundary (101) of the illumination field (49) at the first member end (11) of the light conductive member (7) to provide the viewable aiming indicia (48). In those embodiments that include both a lens (18) and the emitted light refraction surface (51), regardless of the level of or the absence of the first amount of light (9) or the second amount of light (16), the illumination field (49) can be filled or substantially filled to the boundary (101) to present in all light conditions a substantially consistent sized illumination field (49) as the viewable aiming indicia (48). Moreover, the first amount of light (9) or the second amount of light (16), or the combination of both, can be uniformly spread over the illumination field (49) toward or to the boundary (101). The term "boundary" means for the purposes of this invention a boundary (101) of the illuminated field (49) pre-selected by configuration of the lens (18) or the emitted light refracting surface (51) which act on the first amount of light (9) or the second amount of light (16) transmitted through the light conductive member (7) to generate a substantially consistent or consistent boundary (101) of the illuminated field (49) for both the first amount of light (9) or the second amount of light (16) transmitted to the member first end (11) of the light conductive member (7).

Again referring to FIGS. 56 and 57A through 57D, as to particular embodiments, the chamber (42) can be substantially coaxially disposed inside of said light conductive member (7). The lens (18) can be coupled in substantially coaxial relation to the light conductive member (7) and the chamber (42). The emitted light refraction surface (51) can be disposed at the closed end (95) of the chamber (42) in substantially coaxial relation to the chamber (42), the lens (18) and the light conducting member (7).

FIGS. 56 and cross section 57A-57E provide an example of a substantially cylindrical light conducting member (7). The chamber (42) can be coaxially disposed in the cylindrical light conducting member (7) in the form of a coaxial cylindrical bore (71). The light refraction surface (51) can be coaxially disposed at the closed end (95) of the chamber (42) having a conical structure or as a cone (72) having a configuration which refracts the second amount of light (16) to fill the illumination field (49) toward or to the boundary (101). The light emitting element (15) can be a tritium (91) gas-filled capsule (44) having capsule inner surfaces (92) coated with a dopant (93) or phosphor activated by beta radiation emitted by the tritium (91). The gas-filled capsule (44) can be contained in a cylindrical sleeve (102) having a sleeve first end (103) closed by a transparent cover (104) and a sleeve second end (105) open to allow insertion of the gas-filled capsule (44) inside of the cylindrical sleeve (102). The sleeve second end (105) can be closed by an amount of polymeric material (99), such as silicone rubber, acrylic polymer, or the like, which in the uncured condition can be a liquid or gel which can be disposed in the sleeve second end (105) and upon curing serves to close the sleeve second end (105) to retain the glass-filled capsule (44) inside of the cylindrical sleeve (102). The light emitting element (15) can be substantially coaxially disposed inside of the chamber (42).

The light emission assembly (29) can be longitudinally axially secured in the hollow inside space (21) of a base (17), as above described. In the example of FIGS. 56 and 57A, the cylindrical light conductive member (7) can further include an annular groove (55) which can correspondingly receive a circular fastener (58), annular member (56), detent, or the like attached to or extending from the base (17) or the cover (31) to longitudinally axially secure the light emission assembly (29) within the hollow inside space (21) of the base (17).

The particular example of FIGS. 56 and 57A through 57E is not intended to limit the invention solely to this exemplary structure or exemplary relationship of the elements. Rather, the description is intended to broadly encompass a wide range of alternate embodiments with a sufficient number of examples for a person ordinary skill in the art to make use a wide range of alternate embodiments of the invention which may or may not be explicitly described herein.

A method of producing embodiments of the light emission assembly (29) for a weapon sight (1) can include providing a light conductive member (7) having a length disposed between a member first end (11) and a member second end (12) and an external surface (8) configured to receive a first amount of light (9) from a light source (10) external to the light conductive member (7), disposing a chamber (42) inside or entirely inside of the light conductive member (7), and disposing a light emitting element (15) inside or entirely inside of the chamber (42) which emits a second amount of light (16) received by the light conductive member (7). The light conductive member (7) conducting the first and second amount of light (9)(16) to the member first end (11) of said light conductive member (7), thereby providing a viewable aiming indicia (43). The method can further include directly connecting a lens (18) to the member first end (11) of said light conductive member (7). As to particular embodiments, the lens (18) can be produced as a piece discrete from the light conductive member (7); however, the term "directly connected" is also intended to encompass the lens (18) and light conductive member (7) having the chamber (42) disposed therein as a one-piece structure. The method can further include configuring the lens (18) to refract the first amount of light (9) conducted within the light conductive member (7) to pre-selected boundary (101) of an illuminated field (49) at the member first end (11) of the light conductive member (7) to provide the viewable aiming indicia (48). The method can further include configuring the closed end (95) of the chamber (42) as an emitted light refraction surface (51) to refract the second amount of light (16) emitted from the light emitting element (15) toward the pre-selected boundary (101) of the illumination field (49) at the member first end (11) of the light conductive member (7) to provide the viewable aiming indicia (48). The method can further include configuring the lens (18) and the emitted light refraction surface (51) to spread each of the first amount of light (9) and the second amount of light (16) emitted by said light emitting element (15) transmitted within said light conductive member (7) toward or to the pre-selected boundary (101) of the illumination field (49) at the first end (11) of the light conductive member (7) to provide the viewable aiming indicia (48). The method can further include coaxially coupling one or more of the lens (18), the chamber (42), the emitted light refraction surface (51), and the light conductive member (7) in coaxial relation. The term "coaxial or coaxially" for the purposes of this invention means that two or more three dimensional forms, such as the lens (18), the light conductive member (7), the chamber (42), and the emitted light refraction surface (51), share a common axis or are concentric to the extent necessary to spread the first amount of light (9) and the second amount of light (16) toward or to the pre-selected boundary (101) of an illumination field (49) at the member first end (11). The method can further include configuring the chamber (42) as a cylindrical bore (71), and configuring the emitted light refraction surface (51) a cone (72). The term "cone" means for the purposes of this invention a hollow object that tapers from a circular or substantial circular base toward a point including as to particular embodiments truncate cones. The method can also include locating the closed end (95) of the chamber (42) between the member first end (11) and the member second end (12) of the light conductive member (7) and configuring the chamber (42) with an open end (96) communicating with the second end (12) of the light conductive member (7), the open end (96) allowing access to the chamber (42) from the member second end (12). The method can further include sealably engaging an end seal (97) to the open end (96) of the chamber (42). The method can further include doping the light conductive member (7) with one or more dopants (13) which fluoresce in response to said first amount of light (9) conducted within the light conductive member (7). The method can further include doping the light conductive member (7) with one or more dopants (13) which fluoresce in response to the second amount of light (16) emitted by the light emitting element (15).

A method of providing or generating an aiming indicia (48) the light emission assembly (29) can include receiving a first amount of light (9) on the external surface (8) of a light conducting member (7) having a length disposed between a member first end (11) and a member second end (12), conducting the first amount of light (9) within the light conductive member (7) to the member first end (11), emitting a second amount of light (16) from a light emitting element (15) located inside of a chamber (42) disposed inside of the light conducting member (7), conducting the second amount of light (16) within the light conductive member (7) to the member first end (11), spreading both of said first amount of light (9) and said second amount of light (16) transmitted within the light conductive member (7) toward or to the pre-selected boundary (101) of an illumination field (49) to provide the aiming indicia (48) for the light emission assembly (29). The method can further include refracting said first amount of light (9) conducted through the light conductive member (7) to define the boundary (101) of the illumination field (48) and refracting said second amount of light (16) emitted by the light emitting element (15) toward or to the boundary (101) of the illumination field (48), thereby uniformly spreading the first amount of light (9) and the second amount of light (16) toward the boundary (101) of the illumination field (48). The method can further include conducting an amount of fluorescent light (105) emitted by one or more dopants (13) contained in the light conductive member (7) to the member first end (11) of the light conductive member (7). The method can further include activating the one or more dopants (13) contained in the light conductive member (7) with the first amount of light (9) received by the external surface (8) of the light conductive member (7) or activating the one or more dopants (13) contained in the light conductive member (7) with said second amount of light (16) emitted by the light emitting element (15).

Now referring primarily to FIG. 58A through FIG. 65, which show another embodiment of the inventive weapon sight (1) having a light emission assembly (29) which generally includes a light conductive member (7); a chamber (42) disposed inside of the light conductive member (7), whereby the chamber (42) can be configured to contain a light emitting element (15); and a light conductive protrusion (106) axially coupled to the light conductive member (7), whereby the light conductive protrusion (106) terminates in a viewing end (30), and whereby a viewing end cross-sectional area of the viewing end (30) can be lesser than a light conductive member first end cross-sectional area of a light conductive member first end (11).

Now referring primarily to FIG. 58A through FIG. 58I, the light emission assembly (29) includes a light conductive member (7) having a light conductive member length (107) (as shown in FIG. 58E) disposed between the light conductive member first end (11) and a light conductive member second end (12). The light conductive member (7) can be configured to receive a first amount of light (9) from a light source (10) external to the light conductive member (7) and incident upon a light conductive member external surface (8), whereby the light conductive member (7) can conduct at least a portion of the first amount of light (9) to the light conductive member first end (11), for example via internal light transmission. Following, the light conductive member (7) can conduct at least a portion of the first amount of light (9) toward the viewing end (30) of the light conductive protrusion (106) such that at least a portion of the first amount of light (9) can be emitted as an amount of emitted light from the viewing end (30) to provide a viewable aiming indicium (48), as above described.

Further, the light emission assembly (29) can include a chamber (42) disposed inside of the light conductive member (7), whereby the chamber (42) can be configured to contain a light emitting element (15), thus disposing the light emitting element (15) contained within the chamber (42) inside of the light conductive member (7). As to particular embodiments, the chamber (42) can have a location entirely inside of the light conductive member (7).

Now referring primarily to FIG. 58I, as to particular embodiments, the chamber (42) can be defined, either partially or entirely, by a light conductive member internal surface (68) of the light conductive member (7); thus, the light conductive member internal surface (68) can provide one or more chamber walls which define the chamber (42) disposed inside of the light conductive member (7).

Again referring primarily to FIG. 58I, the chamber (42) includes a chamber length (108) disposed between a chamber open end (96) and a chamber closed end (95). The chamber open end (96) can be located proximate the light conductive member second end (12), whereby the light emitting element (15) can be passed through the chamber open end (96) for containment within the chamber (42); the chamber closed end (95) can be disposed opposite the chamber open end (96) and accordingly, distal from the light conductive member second end (12).

As to particular embodiments, the chamber open end (96) can be located at the light conductive member second end (12), meaning that the chamber open end (96) can be defined by the light conductive member internal surface (68) at the light conductive member second end (12) such that the chamber open end (96) can be (i) aligned, (ii) coincident, or (iii) coplanar with the light conductive member second end (12).

As to particular embodiments, the chamber (42) can be provided by a bore (57) longitudinally disposed within the light conductive member (7), whereby the bore (57) can longitudinally extend a distance within the light conductive member (7) from the light conductive member second end (12).

Now referring primarily to FIG. 58I and FIG. 59I, as to particular embodiments, the chamber (42) (and correspondingly, the light-emitting element (15)) can dispose in coaxial relation to the light conductive member (7).

Again referring primarily to FIG. 58I and FIG. 59I, as to particular embodiments, the chamber (42) (and correspondingly, the light-emitting element (15)), can be concentrically disposed within the light conductive member (7).

As to particular embodiments, the light conductive member (7) and the chamber (42) can be configured as cylinders or can have a generally cylindrical shape with a generally circular cross-section, although the instant invention need not be limited to this configuration.

Now referring primarily to FIG. 59A through FIG. 60, the light emission assembly (29) can further include a light emitting element (15) contained within the chamber (42) or disposed inside of the chamber (42), whereby the light emitting element (15) can emit a second amount of light (16), as described above.

Following, the light conductive member (7) can be configured to receive the second amount of light (16) emitted from the light emitting element (15), whereby the light conductive member (7) can conduct at least a portion of the second amount of light (16) to the light conductive member first end (11), for example via internal light transmission. Following, the light conductive member (7) can conduct at least a portion of the second amount of light (16) toward the viewing end (30) of the light conductive protrusion (106) such that at least a portion of the second amount of light (16) can be emitted as an amount of emitted light from the viewing end (30) to provide a viewable aiming indicium (48), as above described.

As to particular embodiments, the light emitting element (15) can include a radionucleotide which emits beta radiation, as described above. As but one illustrative example, the radionucleotide can include tritium (91), and the light-emitting element (15) can be configured as a gaseous tritium light source (109) which includes a glass form (110), such as a vial or capsule, produced from glass, such as borosilicate glass, which can be internally coated with a phosphor and filled with tritium gas (91), whereby the glass form (110) can be hermetically sealed, for example by a laser. As but one illustrative example, a gaseous tritium light source (109) which may be useful with the instant invention can be product T5576 available from MB-Microtec, or the like.

As to particular embodiments, the gaseous tritium light source (109) can be configured as a sealed glass form (110) disposed within an associated protective sleeve (not shown), whereby as illustrative examples, the protective sleeve may be formed from metal (such as aluminum) or plastic. Correspondingly, the protective sleeve can be coupled to, disposed about, or surrounding (for example, circumferentially surrounding) at least a length of the sealed glass form (110). In this particular embodiment (not shown), a discrete gaseous tritium light source (109) thus includes both the sealed glass form (110) and the associated protective sleeve. Accordingly, when this particular embodiment of the gaseous tritium light source (109) is disposed within the chamber (42) located inside of the light conductive member (7), both the sealed glass form (110) and the associated protective sleeve are contained within the chamber (42). As non-limiting examples, a discrete gaseous tritium light source (109) that includes both the sealed glass form (110) and the associated protective sleeve which may be useful with the instant invention can be tactical inserts, such as TRIGALIGHT® inserts or Next Generation Inserts, both available from MB-Microtec, or the like.

As to other particular embodiments, the gaseous tritium light source (109) can be configured as a discrete sealed glass form (110), which can be directly disposed or disposed "as is" within the chamber (42) located inside of the light conductive member (7). As to this particular embodiment, upon disposition of the sealed glass form (110) within the chamber (42), the portion of the light conductive member (7) which provides the chamber wall(s) which define the chamber (42) can additionally provide or function as a protective sleeve (111) which couples to, disposes about, or surrounds (for example, circumferentially surrounds) at least a length of the sealed glass form (110). In this particular embodiment, a discrete gaseous tritium light source (109) includes only the sealed glass form (110), or consists of the sealed glass form (110). Accordingly, in this particular embodiment, the discrete gaseous tritium light source (109) can be sleeveless or void of a protective sleeve until the sealed glass form (110) is disposed within the chamber (42), after which the portion of the light conductive member (7) which provides the chamber wall(s) can provide or function as the protective sleeve (111).

As to particular embodiments, the gaseous tritium light source (109) can further include a cap (not shown) at one or both ends of the sealed glass form (110), whereby the cap can be formed from a protective material, such as sapphire.

Now referring primarily to FIG. 59I, the light emission assembly (29) can further include a first layer (112) coupled to, disposed about, or surrounding (for example, circumferentially surrounding) at least a length of the light emitting element (15), whereby the first layer (112) can function as one or more of (i) an impact-absorbing layer, (ii) an adhesive layer, or (iii) a reflective layer (iii).

As to particular embodiments having the light emitting element (15) configured as a gaseous tritium light source (109), the first layer (112) can be disposed between the gaseous tritium light source (109) and in particular, the sealed glass form (110), and the portion of the light conductive member internal surface (68) which provides the chamber wall(s) which define the chamber (42). As but one illustrative example, the first layer (112) can be formed from a silicone-based material or an epoxy-based material, which may be transparent, translucent, or opaque, depending upon the embodiment.

Now referring primarily to FIG. 59A through FIG. 60, as to particular embodiments, the light emission assembly (29) can further include a second layer (113) coupled to, disposed about, or surrounding (for example, circumferentially surrounding) at least a length of the light emitting element (15), whereby the second layer (113) can function as one or more of (i) an impact-absorbing layer, (ii) an adhesive layer, or (iii) a reflective layer (iii). As to particular embodiments, the second layer (113) can be coupled to, disposed about, or surround (for example, circumferentially surround) the light conductive member (7) and in particular, the light conductive member external surface (8), proximate to or surrounding the chamber (42) and correspondingly, the light-emitting element (15).

As to particular embodiments, the second layer (113) can include a reflective material on at least the second layer inner surface (114) which disposes toward the chamber (42) and correspondingly, the light-emitting element (15). Thus, the second layer (113) can inwardly reflect at least a portion of the second amount of light (16) emitted from the light emitting element (15) toward the light conductive member (7) for internal light transmission toward the light conductive member first end (11) and the viewing end (30) of the light conductive protrusion (106). Subsequently, an embodiment of the light emission assembly (29) including the second layer (113) can provide an amount of emitted light from the viewing end (30) of the light conductive protrusion (106) which can be brighter than the amount of emitted light provided by an embodiment of the light emission assembly (29) which does not include the second layer (113), thereby enhancing the brightness of the viewable aiming indicium (48).

As but one illustrative example, the second layer (113) can be formed from a coating which includes a reflective material, such as an adhesive or paint (for example, a silicone-based adhesive or paint, an epoxy-based adhesive or paint, a polyurethane-based adhesive or paint, or the like, or combinations thereof) which includes a reflective pigment, such as a white pigment. As non-limiting examples, the white pigment can comprise stibous oxide ($SB_2O_3$), barium sulfate ($BaSO_4$), titanium dioxide ($TiO_2$), zinc oxide (ZnO), or the like, or combinations thereof.

Now referring primarily to FIG. 58A through FIG. 58I, as to particular embodiments, the light conductive member (7) can be perimetrically or circumferentially recessed, and in particular, the light conductive member external surface (8), proximate to or surrounding the chamber (42) and correspondingly, the light-emitting element (15), can be perimetrically or circumferentially recessed. Following, the second layer (113) can be coupled to, disposed about, or surround (for example, circumferentially surround) the perimetrically or circumferentially recessed portion of the light conductive member (7) such that the light conductive member external surface (8) and an outer surface of the second layer (113) can be generally flush or axially aligned.

Now referring primarily to FIG. 59I and FIG. 60, the light emission assembly (29) can further include an end seal (97), as described above, which can be configured to sealably engage with the chamber open end (96) and/or the light conductive member second end (12) to close the chamber (42) and thus, enclose a volume of the chamber (42) and contain the light emitting element (15) within the chamber (42).

As to particular embodiments, the end seal (97) can include a reflective material on at least an end seal inner surface (115) which disposes toward the chamber (42) and correspondingly, the light-emitting element (15) when the end seal (97) sealably engages with the chamber open end (96). Thus, the end seal (97) can inwardly reflect at least a portion of the second amount of light (16) emitted from the light emitting element (15) toward the light conductive member (7) for internal light transmission toward the light conductive member first end (11) and the viewing end (30) of the light conductive protrusion (106). Subsequently, an embodiment of the light emission assembly (29) including an end seal (97) having reflective material on at least the end seal inner surface (115) can provide an amount of emitted light from the viewing end (30) of the light conductive protrusion (106) which can be brighter than the amount of emitted light provided by an embodiment of the light emission assembly (29) which does not include an end seal (97) having reflective material on at least the end seal inner surface (115), thereby enhancing the brightness of the viewable aiming indicium (48).

Now referring primarily to FIG. 58A through FIG. 60, the light emission assembly (29) can further include a light conductive protrusion (106) axially coupled to the light conductive member (7) proximate, adjacent to, or at the light conductive member first end (11), whereby the light conductive protrusion (106) terminates in a viewing end (30) which can emit an amount of emitted light to provide a viewable aiming indicium (48).

The term "axial" as used herein means in a direction generally parallel or parallel to a longitudinal axis. Accordingly, the light conductive protrusion (106) and the light conductive member (7) can be axially aligned such that their longitudinal axes can be generally parallel or parallel. Said another way, the light conductive protrusion (106) and the light conductive member (7) can be generally coaxially aligned or coaxially aligned. Said yet another way, the light conductive protrusion (106) can outwardly extend from the light conductive member (7) in an axial direction.

As to particular embodiments, the light conductive protrusion (106) and the light conductive member (7) can be axially aligned such that their longitudinal axes can be generally coincident or coincident.

The light conductive protrusion (106) can have a light conductive protrusion length disposed between a light conductive protrusion first end (116) which provides the viewing end (30) and a light conductive protrusion second end (117). Correspondingly, the light conductive protrusion second end (117) can be axially coupled to the light conductive member (7) and in particular, to the light conductive member first end (11).

The light conductive protrusion (106) can be made from a material similar to or the same as the material which forms the light conductive member (7). Following, the light conductive protrusion (106) can be configured to conduct at least a portion of the first and second amounts of light (9)(16) to the viewing end (30), for example via internal light transmission, such that at least a portion of the first and second amounts of light (9)(16) can be emitted as an amount of emitted light from the viewing end (30) to provide a viewable aiming indicium (48).

As to particular embodiments, the light conductive protrusion (106) and the light conductive member (7) can be integrated such that the light conductive protrusion (106)

and the light conductive member (7) are formed as a one-piece construct. Said another way, the light conductive protrusion (106) and the light conductive member (7) can be integrally formed, meaning connected together so as to make up a single complete piece or unit, or so as to work together as a single complete piece or unit, and so as to be incapable of being easily dismantled without destroying the integrity of the piece or unit. Said yet another way, the light conductive protrusion (106) and the light conductive member (7) can be axially contiguous.

Now referring primarily to FIG. 58C, a viewing end cross-sectional area of the viewing end (30) of the light conductive protrusion (106) can be lesser than a light conductive member first end cross-sectional area of the light conductive member first end (11) of the light conductive member (7).

As to particular embodiments, a light conductive protrusion cross-sectional area can be generally constant or constant along the light conductive protrusion length. As to these particular embodiments, a light conductive protrusion cross-sectional area of the light conductive protrusion (106) can be lesser than a light conductive member first end cross-sectional area of the light conductive member first end (11) of the light conductive member (7).

As to particular embodiments, a viewing end diameter of the viewing end (30) of the light conductive protrusion (106) can be lesser than a light conductive member first end diameter of the light conductive member first end (11) of the light conductive member (7).

The term "diameter" as used herein means the length of a line through the center of an object, whereby the object may but need not be a circle.

As to particular embodiments, a light conductive protrusion diameter can be generally constant or constant along the light conductive protrusion length. As to these particular embodiments, the light conductive protrusion diameter can be lesser than a light conductive member first end diameter of the light conductive member first end (11) of the light conductive member (7).

As to particular embodiments, a viewing end perimeter or circumference of the viewing end (30) of the light conductive protrusion (106) can be lesser than a light conductive member first end perimeter or circumference of the light conductive member first end (11) of the light conductive member (7).

The term "circumference" as used herein means the external boundary or surface of an object, whereby the object may but need not be a circle.

As to particular embodiments, a light conductive protrusion perimeter or circumference can be generally constant or constant along the light conductive protrusion length. As to these particular embodiments, the light conductive protrusion perimeter or circumference can be lesser than a light conductive member first end perimeter or circumference of the light conductive member first end (11) of the light conductive member (7).

As to particular embodiments, the light conductive protrusion cross-sectional area, diameter, perimeter, and/or circumference can be generally constant or constant along the light conductive protrusion length, and the light conductive member cross-sectional area, diameter, perimeter, and circumference can be generally constant or constant along the light conductive member length (107). As to these particular embodiments, the light conductive protrusion cross-sectional area, diameter, perimeter, and/or circumference can be lesser than the corresponding light conductive member cross-sectional area, diameter, perimeter, and/or circumference.

As to particular embodiments, the light conductive protrusion (106) and the light conductive member (7) can be configured as cylinders or can have a generally cylindrical shape with a generally circular cross-section, although the instant invention need not be limited to this configuration.

Now referring primarily to FIG. 58J and FIG. 58K, as to particular embodiments, the light conductive protrusion (106) and the light conductive member (7) can be coupled through a transitional portion (34) having a transitional portion first end (35) proximate the light conductive protrusion second end (117) and a transitional portion second end (36) proximate the light conductive member first end (11). A transitional portion external surface (118) of the transitional portion (34) can be longitudinally arcuate or arcuate in relation to the longitudinal axes of the light conductive protrusion (106) and the light conductive member (7), whereby the curvature of the transitional portion external surface (118) may be advantageous for precluding separation of the light conductive protrusion (106) and the light conductive member (7). Following, the curvature of the transitional portion external surface (118) may prevent the light conductive protrusion (106) from breaking off from the light conductive member (7).

Now referring primarily to FIG. 61A through FIG. 65, the light emission assembly (29) can be configured for disposition within a base (17), whereby the base (17) can have a configuration capable of retaining the light emission assembly (29) in fixed relation to a weapon (2) for aiming, as described above.

Now referring primarily to FIG. 62A through FIG. 62C, the base (17) can include a base interior space (21) configured to contain the light emission assembly (29), whereby the base interior space (21) can be defined, either partially or entirely, by a base internal surface (22) of the base (17); thus, the base internal surface (22) can provide one or more base interior space walls which define the base interior space (21) disposed inside of the base (17).

The base internal surface (22) can further define a base open end (26) which communicates with the base interior space (21), whereby the light emission assembly (29) can be passed through the base open end (26) for containment within the base interior space (21). Upon disposition of the light emission assembly (29) within the base interior space (21), the viewing end (30) of the light conductive protrusion (106) can dispose proximate the base open end (26) such that the viewing end (30) can be viewable and thus, can provide a viewable aiming indicium (48) upon emission an amount of emitted light.

The base (17) can further include one or more aperture elements (23), each of which can define an aperture element opening which communicates between the base interior space (21) and a base external surface (119) of the base (17). Thus, upon disposition of the light emission assembly (29) within the base interior space (21), a first amount of light (9) from a light source (10) external to the light conductive member (7) can travel through the aperture element opening for incidence upon the light conductive member external surface (8) and subsequent internal light transmission toward the viewing end (30) of the light conductive protrusion (106) to provide a viewable aiming indicium (48) upon emission an amount of emitted light.

As to particular embodiments, the base internal surface (22) can define a base interior space (21) with dimensions sufficient to at least partially dispose about or surround the light conductive member (7).

As to particular embodiments, the base interior space (21) includes a cross-sectional area, diameter, perimeter, and/or circumference which can be sufficient to circumferentially surround the light conductive member (7). As to particular embodiments, the base interior space (21) can have a cross-sectional area, diameter, perimeter, and/or circumference which can be just large enough to accommodate the cross-sectional area, diameter, perimeter, and/or circumference of the light conductive member (7). Thus, upon receipt within the base interior space (21), the outer circumferential surface of the light conductive member (7) can be circumferentially adjacent to the base internal surface (22).

Further, the base interior space (21) can include a base interior space length which can be sufficient to contain the entire length of the light emission assembly (29), meaning that the base interior space length can be sufficient to contain both the light conductive member length (107) and the light conductive protrusion length.

Following, because the light conductive protrusion cross-sectional area, diameter, perimeter, and/or circumference can be lesser than the corresponding light conductive member cross-sectional area, diameter, perimeter, and/or circumference, upon disposition of the light emission assembly (29) within the base interior space (21), an annular space (120) can be created between the base internal surface (22) and the outer circumferential surface of the light conductive protrusion (106) (as shown in the example of FIG. 61K).

Now referring primarily to FIG. 61A through FIG. 61I, and FIG. 63 through FIG. 65, the light emission assembly (29) can further include an annular fastener (121) configured for receipt within the annular space (120), whereby the annular fastener (121) can be (i) fixedly or permanently disposed within the annular space (120), for example via press fitting, or (ii) removably disposed within the annular space (120), for example via matable spiral threads. Upon disposition of the annular fastener (121) within the annular space (120), an annular fastener outer circumferential surface (122) can sealably or securely engage with the base internal surface (22) which defines the annular space (120) to correspondingly seal or secure the light emission assembly (29) within the base interior space (21).

Now referring primarily to FIG. 63, the annular fastener (121) can include the annular fastener outer circumferential surface (122) and an annular fastener inner surface (123), whereby the annular fastener inner surface (123) can define an annular fastener opening (124) communicating between annular fastener first and second ends (125)(126).

Upon disposition and securement of the light emission assembly (29) within the base interior space (21) via the annular fastener (121), at least a portion of the light conductive protrusion (106) and in particular, at least a portion of the light conductive protrusion length, can dispose within the annular fastener opening (124). Additionally, the viewing end (30) of the light conductive protrusion (106) can dispose proximate the annular fastener first end (125) as well as the base open end (26) such that the viewing end (30) can be viewable and thus, can provide a viewable aiming indicium (48) upon emission of an amount of emitted light.

As to particular embodiments, upon disposition and securement of the light emission assembly (29) within the base interior space (21) via the annular fastener (121), the entirety of the annular fastener opening (124) can be filled by the light conductive protrusion (106).

In particular, no gap may be present between the annular fastener inner surface (123) and the outer circumferential surface of the light conductive protrusion (106). Thus, the entirety of the annular fastener inner surface (123) between the annular fastener first and second ends (125)(126) can be adjacent to or in contact with the outer circumferential surface of the light conductive protrusion (106).

Additionally, a viewing end cross-sectional area of the viewing end (30) of the light conductive protrusion (106) can be at least be (i) aligned, (ii) coincident, or (iii) coplanar with the annular fastener first end (125) such that the viewing end (30) does not inwardly extend into the annular fastener opening (124). Correspondingly, no gap may be present between the annular fastener first end (125) and the viewing end (30).

Advantageously, by configuring the light conductive protrusion (106) such that, upon disposition and securement of the light emission assembly (29) within the base interior space (21) via the annular fastener (121), the entirety of the annular fastener opening (124) is filled by the light conductive protrusion (106), debris may be precluded from ingressing into the annular fastener opening (124) and further, debris may be precluded from impeding the view of the viewing end (30) and accordingly, the viewable aiming indicium (48). Remarkably, impediment of the view of the viewing end of conventional illuminated sighting devices by debris has been noted. Thus, the instant invention advances the art by at least providing a solution to this problem.

Additionally, as to particular embodiments, a viewing end cross-sectional area of the viewing end (30) of the light conductive protrusion (106) can be at least be (i) aligned, (ii) coincident, or (iii) coplanar with the base open end (26) such that the viewing end (30) does not inwardly extend into the base interior space (21). Correspondingly, no gap may be present between the base open end (26) and the viewing end (30).

As to particular embodiments, the annular fastener (121) can include a colored material on at least the annular fastener first end (125) which disposes about the viewing end (30) of the light conductive protrusion (106) when the light emission assembly (29) is secured within the base interior space (21) via the annular fastener (121).

As to particular embodiments, the annular fastener (121) can be configured as a solid element which can be solid prior to and upon receipt within the annular space (120) (as shown in the example of the Figures).

As to other particular embodiment, the annular fastener (121) can be configured as a fluid element prior to disposition within the annular space (20), whereby upon receipt within the annular space (120), the fluid element can morph into a semi-solid or solid element to seal or secure the light emission assembly (29) within the base interior space (21). As but one illustrative example of this embodiment, the annular fastener (121) can be formed from epoxy or the like.

Now referring primarily to FIG. 58J and FIG. 58K, the light emission assembly (29) can further include a lens (18) axially coupled to the light conductive protrusion (106), whereby the lens (18) can provide the viewing end (30) of the light conductive protrusion (106).

As to particular embodiments, the lens (18) can be connected or directly connected to the light conductive protrusion (106), and in particular to the light conductive protrusion first end (116) to provide the viewing end (30).

As to particular embodiments, the lens (18) and the light conductive protrusion (106) can be integrated such that the lens (18) and the light conductive protrusion (106) are formed as a one-piece construct. Said another way, the lens (18) and the light conductive protrusion (106) can be integrally formed, meaning connected together so as to make up a single complete piece or unit, or so as to work together as a single complete piece or unit, and so as to be incapable of being easily dismantled without destroying the integrity of the piece or unit. Said yet another way, the lens (18) and the light conductive protrusion (106) can be axially contiguous. As to these particular embodiments, the lens (18) can be made from a material similar to or the same as the material which forms the light conductive protrusion (106).

As to particular embodiments, the lens (18), the light conductive protrusion (106), and the light conductive member (7) can be integrated such that the lens (18), the light conductive protrusion (106), and the light conductive member (7) are formed as a one-piece construct. Said another way, the lens (18), the light conductive protrusion (106), and the light conductive member (7) can be integrally formed, meaning connected together so as to make up a single complete piece or unit, or so as to work together as a single complete piece or unit, and so as to be incapable of being easily dismantled without destroying the integrity of the piece or unit. Said yet another way, the lens (18), the light conductive protrusion (106), and the light conductive member (7) can be axially contiguous. As to these particular embodiments, the lens (18) can be made from a material similar to or the same as the material which forms the light conductive protrusion (106) and the light conductive member (7).

As to particular embodiments, the lens (18) can be configured as described above, whereby the lens (18) can function to direct the portion of the first and second amounts of light (9)(16) internally transmitted within the light conductive member (7) and the light conductive protrusion (106) toward the viewing end (30) to substantially fill an illumination field (49) to provide the viewable aiming indicium (48), as described above.

As to particular embodiments, the lens (18) can substantially uniformly spread the portion of the first and second amounts of light (9)(16) internally transmitted within the light conductive member (7) and the light conductive protrusion (106) toward the viewing end (30) to substantially fill an illumination field (49) to provide the viewable aiming indicium (48), as described above.

Now referring primarily to FIG. 58J and FIG. 58K, as to particular embodiments, the lens (18) can include a lens surface (127) having a generally hemispherical or partial spherical configuration, as described above. Said another way, the lens (18) can include a convex lens surface (127).

Again referring primarily to FIG. 58J and FIG. 58K, as to particular embodiments, the convex lens surface (127) can be textured or a texture element (128) can be coupled to the convex lens surface (127).

Now regarding production, a method of making a particular embodiment of the light emission assembly (29) can include forming the light conductive member (7) by injection molding. As to other particular embodiments, the light conductive member (7) can be formed from alternative processes, including but not limited to compression molding, extrusion molding, fabrication, machining, printing, additive printing, three-dimensional printing, or the like, or combinations thereof.

As to particular embodiments whereby the light conductive member (7) is formed by injection molding, this process may be in contrast to the method of making conventional illuminated sighting devices which include a fiber optic source which has typically been cut to provide the component used in the illuminated sighting device.

As to particular embodiments, a method of making a particular embodiment of the light emission assembly (29) can include forming the light conductive member (7) and the light conductive protrusion (106) as a one-piece construct by injection molding.

As to particular embodiments, a method of making a particular embodiment of the light emission assembly (29) can include integrally forming the light conductive member (7) and the light conductive protrusion (106) by injection molding.

As to particular embodiments, a method of making a particular embodiment of the light emission assembly (29) can include forming the light conductive member (7), the light conductive protrusion (106), and the lens (18) as a one-piece construct by injection molding.

As to particular embodiments, a method of making a particular embodiment of the light emission assembly (29) can include integrally forming the light conductive member (7), the light conductive protrusion (106), and the lens (18) by injection molding.

As can be easily understood from the foregoing, the basic concepts of the present invention may be embodied in a variety of ways. The invention involves numerous and varied embodiments of a weapon sight light emission system which can be incorporated into a wide variety of sights for weapons.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a sight" should be understood to encompass disclosure of the act of "sighting"—whether explicitly discussed or not—and, conversely, were there effectively disclosure of the act of "sighting", such a disclosure should be understood to encompass disclosure of "sighting" and even a "means for sighting." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a light source" refers to one or more of those light sources. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Thus, the applicant(s) should be understood to claim at least: i) each of the weapon sight light emission devices herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A light emission assembly for a weapon sight, comprising:
   a light conductive member having a light conductive member length disposed between light conductive member first and second ends;
   a chamber disposed inside of said light conductive member proximate said light conductive member second end;
   wherein said chamber is configured to contain a light emitting element; and
   a light conductive protrusion axially coupled to said light conductive member proximate said light conductive member first end;
   wherein said light conductive protrusion terminates in a viewing end, said viewing end cross-sectional area lesser than a light conductive member first end cross-sectional area.

2. The light emission assembly of claim 1, wherein said light conductive member is configured to:
   receive a first amount of light from a light source external to said light conductive member; and
   transmit at least a portion of said first amount of light internally toward said light conductive member first end.

3. The light emission assembly of claim 2, wherein said light conductive member is further configured to:
   transmit at least a portion of said first amount of light internally toward said viewing end;
   wherein at least a portion of said first amount of light is emitted as a first amount of emitted light from said viewing end to provide a viewable aiming indicium.

4. The light emission assembly of claim 1, further comprising one or more dopants contained within said light conductive member;
   wherein said dopants fluoresce in response to said first amount of light transmitted internally within said light conductive member.

5. The light emission assembly of claim 1, wherein said light emitting element emits a second amount of light.

6. The light emission assembly of claim 5, wherein said light conductive member is configured to:
   receive said second amount of light emitted from said light emitting element; and
   transmit at least a portion of said second amount of light internally toward said light conductive member first end.

7. The light emission assembly of claim 6, wherein said light conductive member is further configured to:

transmit at least a portion of said second amount of light internally toward said viewing end;
wherein at least a portion of said second amount of light is emitted as a second amount of emitted light from said viewing end to provide said viewable aiming indicium.

8. The light emission assembly of claim 1, wherein said light emitting element comprises a gaseous tritium light source.

9. The light emission assembly of claim 1, further comprising a second layer disposed about said light emitting element.

10. The light emission assembly of claim 9, wherein said second layer disposes about said light conductive member.

11. The light emission assembly of claim 9, wherein said second layer comprises a reflective material.

12. The light emission assembly of claim 1, further comprising an end seal configured to engage with a chamber open end to seal said chamber.

13. The light emission assembly of claim 12, wherein said end seal comprises a reflective material.

14. The light emission assembly of claim 1, wherein said light conductive protrusion and said light conductive member are formed as a one-piece construct.

15. The light emission assembly of claim 1, wherein said light emission assembly is configured for disposition within a base.

16. The light emission assembly of claim 15, wherein said base comprises a base interior space defined by a base internal surface of said base; and
wherein said base interior space is configured to contain said light emission assembly.

17. The light emission assembly of claim 16, wherein upon disposition of said light emission assembly within said base interior space, an annular space is created between said base internal surface and a light conductive protrusion external surface of said light conductive protrusion.

18. The light emission assembly of claim 17, further comprising an annular fastener configured for receipt within said annular space to secure said light emission assembly within said base interior space.

19. The light emission assembly of claim 1, further comprising a lens axially coupled to said light conductive protrusion.

20. The light emission assembly of claim 19, wherein said lens, said light conductive protrusion, and said light conductive member are formed as a one-piece construct.

21. The light emission assembly of claim 1, further comprising a texture element coupled to said convex lens surface.

* * * * *